US012722441B2

(12) United States Patent
Taylor et al.

(10) Patent No.: US 12,722,441 B2
(45) Date of Patent: Sep. 1, 2026

(54) SHOCK ASSEMBLY WITH BY-PASS AND HYDRAULIC ADJUST

(71) Applicant: Fox Factory, Inc., Duluth, GA (US)

(72) Inventors: Andrew Taylor, Scotts Valley, CA (US); Ivan Tong, San Diego, CA (US); Hunter Brown, Braselton, GA (US); Matthew Stewart, Buford, GA (US); Tyler Eston, Solon, OH (US)

(73) Assignee: Fox Factory, Inc., Duluth, GA (US)

( * ) Notice: Subject to any disclaimer, the term of this patent is extended or adjusted under 35 U.S.C. 154(b) by 663 days.

(21) Appl. No.: 18/143,505

(22) Filed: May 4, 2023

(65) Prior Publication Data

US 2023/0356558 A1 Nov. 9, 2023

Related U.S. Application Data

(60) Provisional application No. 63/338,361, filed on May 4, 2022.

(51) Int. Cl.
*B60G 17/08* (2006.01)
*B60G 13/08* (2006.01)

(52) U.S. Cl.
CPC ............ *B60G 17/08* (2013.01); *B60G 13/08* (2013.01); *B60G 2202/24* (2013.01); *B60G 2202/416* (2013.01); *B60G 2204/62* (2013.01); *B60G 2206/41* (2013.01); *B60G 2500/02* (2013.01); *B60G 2500/104* (2013.01); *B60G 2500/11* (2013.01); *B60G 2800/162* (2013.01)

(58) Field of Classification Search
CPC .... B60G 17/08; B60G 13/08; B60G 2202/24; B60G 2202/416; B60G 2204/62; B60G 2206/41; B60G 2500/02; B60G 2500/11; B60G 2500/104; B60G 2800/162
USPC ....................... 188/315–318, 322.13, 322.19
See application file for complete search history.

(56) References Cited

U.S. PATENT DOCUMENTS 5,460,355 A 10/1995 Danek
6,296,092 B1 10/2001 Marking et al.
7,051,526 B2 * 5/2006 Geiger .................... F16D 48/02 60/475
8,627,932 B2 1/2014 Marking
8,838,335 B2 9/2014 Bass et al.
8,857,580 B2 10/2014 Marking
9,033,122 B2 5/2015 Ericksen et al.
9,120,362 B2 9/2015 Marking
9,133,902 B2 * 9/2015 Spyche, Jr. ............... F16F 9/44
9,239,090 B2 1/2016 Marking et al.
9,353,818 B2 5/2016 Marking
9,371,882 B2 * 6/2016 Haller ....................... F16F 9/34
9,452,654 B2 9/2016 Ericksen et al.
9,605,726 B2 * 3/2017 Baldoni .................... F16F 9/49
9,623,716 B2 4/2017 Cox
9,682,604 B2 6/2017 Cox et al.
9,797,467 B2 10/2017 Wootten et al.
9,879,744 B2 * 1/2018 Haller ....................... F16F 9/46
10,036,443 B2 7/2018 Galasso et al.

(Continued)

*Primary Examiner* — Christopher P Schwartz

(57) ABSTRACT

A valve assembly for a shock assembly is described. The valve assembly includes a first valve disposed along a compression bypass flow path extending between a compression side and a rebound side of the damping housing, the first valve configured to control flow of fluid from at least one bypass valve of the compression side of the damping housing into the rebound side of the damping housing.

12 Claims, 19 Drawing Sheets

(56) References Cited

U.S. PATENT DOCUMENTS

| | | | | |
|---|---|---|---|---|
| 10,040,329 | B2 | 8/2018 | Ericksen et al. | |
| 10,047,817 | B2 | 8/2018 | Ericksen et al. | |
| 10,060,499 | B2 | 8/2018 | Ericksen et al. | |
| 10,415,662 | B2 | 9/2019 | Marking | |
| 10,576,803 | B2 | 3/2020 | Marking et al. | |
| 10,737,546 | B2 | 8/2020 | Tong | |
| 11,440,366 | B1 * | 9/2022 | O'Shea | F16F 9/065 |
| 11,472,252 | B2 | 10/2022 | Tong | |
| 11,642,931 | B2 * | 5/2023 | Kim | B60G 17/08 188/322.13 |
| 11,879,517 | B2 * | 1/2024 | Shimauchi | B62K 25/20 |
| 11,892,051 | B2 * | 2/2024 | Tucker | F15B 15/149 |
| 12,173,774 | B2 * | 12/2024 | Awano | F16F 9/185 |
| 12,479,259 | B2 * | 11/2025 | Belter | B60G 17/08 |
| 2011/0187065 | A1 * | 8/2011 | Van Der Knaap | B60G 17/016 280/5.507 |
| 2017/0356522 | A1 * | 12/2017 | Kurita | F16F 9/46 |
| 2021/0323370 | A1 * | 10/2021 | Brandstetter | B60G 15/062 |
| 2022/0242186 | A1 | 8/2022 | Tong | |

* cited by examiner

SHOCK ASSEMBLY WITH BY-PASS AND HYDRAULIC ADJUST

CROSS-REFERENCE TO RELATED APPLICATIONS

This application claims the benefit of and claims priority of U.S. provisional patent application Ser. No. 63/338,361, filed on May 4, 2022, entitled "DAMPER WITH BY-PASS AND HYDRAULIC ADJUST" by Taylor et al., assigned to the assignee of the present application, which is herein incorporated by reference in its entirety.

FIELD OF THE INVENTION

Embodiments generally relate to a shock assembly for a vehicle.

BACKGROUND

Shock assemblies are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle.

Conventional shock assembly components provide a constant damping rate during compression or extension through the entire length of the stroke. Other conventional shock assembly components provide mechanisms for varying the damping rate. Further, in the world of bicycles, shock assembly components are most prevalently mechanical. As various types of recreational and sporting vehicles continue to become more technologically advanced, what is needed in the art are improved techniques for varying the damping rate of a shock assembly.

BRIEF DESCRIPTION OF THE DRAWINGS

Aspects of the present invention are illustrated by way of example, and not by way of limitation, in the accompanying drawings, wherein.

Figure 1:
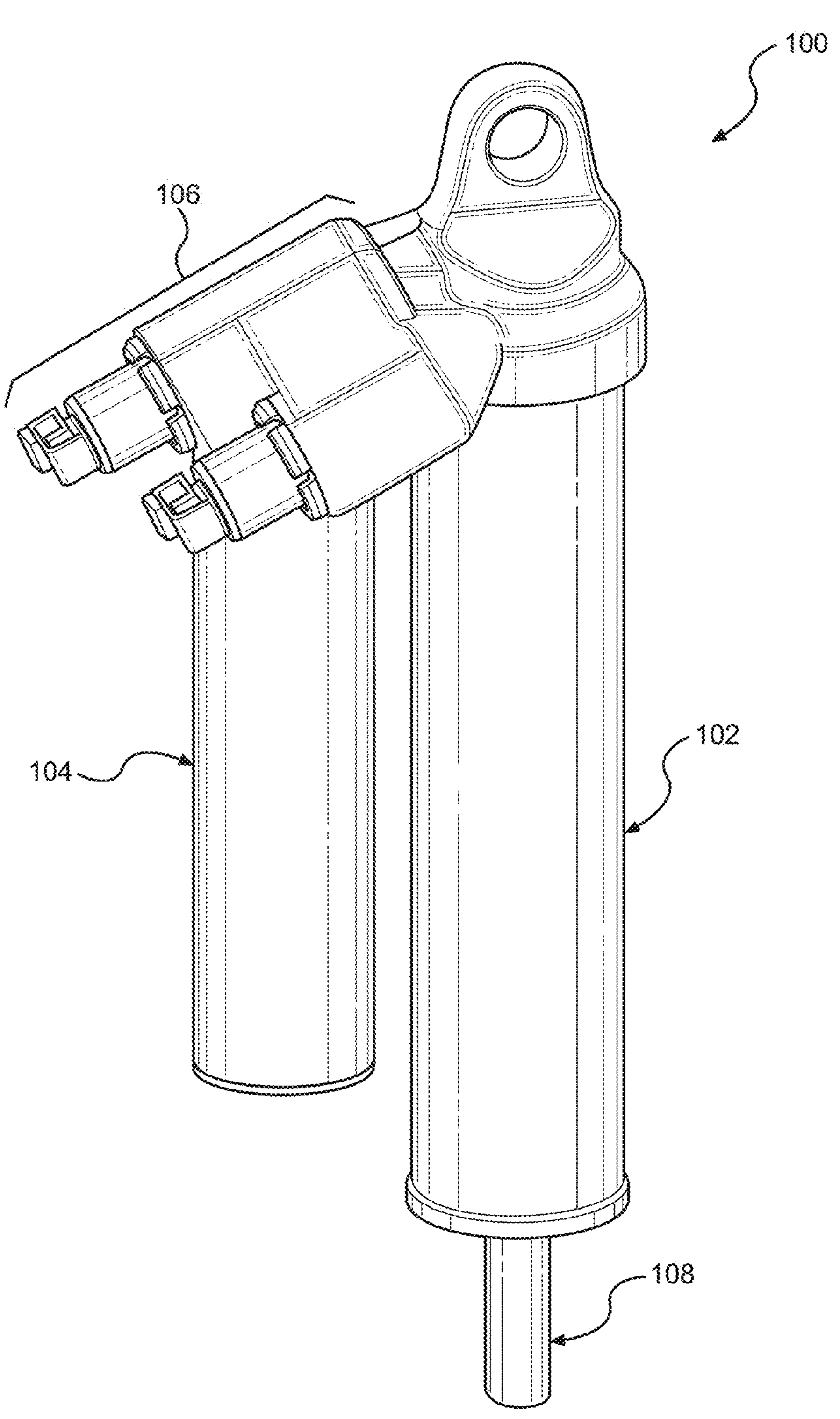
FIG. 1 is a perspective view of a shock assembly including a valve assembly, in accordance with an embodiment of the present invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Notation and Nomenclature

Unless specifically stated otherwise as apparent from the following discussions, it is appreciated that throughout the present Description of Embodiments, discussions utilizing terms such as "sensing" or the like, often refer to the actions and processes of a computer system or similar electronic computing device (or portion thereof) such as, but not limited to, a control system. (See FIG. 11) The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, and/or display components of the electronic computing device or other electronic computing device(s). Under the direction of computer-readable instructions, the electronic computing device may carry out operations of one or more of the methods described herein.

In the following discussion, the term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Overview of Discussion

Embodiments described herein disclose a new compression valve placement between the bypass holes on the compression side and the refill hole(s) of the rebound side of the damper chamber. In so doing, the main piston bypass flow is controlled in compression by the compression valve. In one embodiment, the compression valve can control the stiffness of the shock assembly while the piston is operating within the ride zone bypass holes. However, after the main piston has passed the position sensitive (ride zone) bypass holes, the compression aspects of the shock assembly would be at its stiffest such that the only fluid moving from the compression side to the rebound side would move through the valving in the main piston.

One embodiment includes a hydraulic pump circuit to provide a fully active shock assembly. In one embodiment, the hydraulic pump circuit moves fluid from the rebound side to the compression side to increase the overall length of the shock assembly. In one embodiment, the hydraulic pump circuit moves fluid from the compression side to the rebound side to reduce the overall length of the shock assembly. The hydraulic pump is operated at no speed, low speed, and/or high speed. In one embodiment, the design discussed herein is backward compatible with current internal bypass position sensitive technology.

FIG. 1 is a perspective view of a shock assembly 100. As shown in FIG. 1, shock assembly 100 includes a damping cylinder 102 and a reservoir chamber 104 in fluid communication with damping cylinder 102. Shock assembly 100 also includes a valve assembly 106. FIG. 1 also includes a shaft 108 which can move telescopically with respect to damping cylinder 102. In one embodiment, shock assembly 100 is a twin-tube shock assembly, however, embodiments of the present invention are also well-suited to use with other types of shock assemblies including, but not limited to, a triple-tube shock assembly, a monotube shock assembly, etc.

Figure 2A:
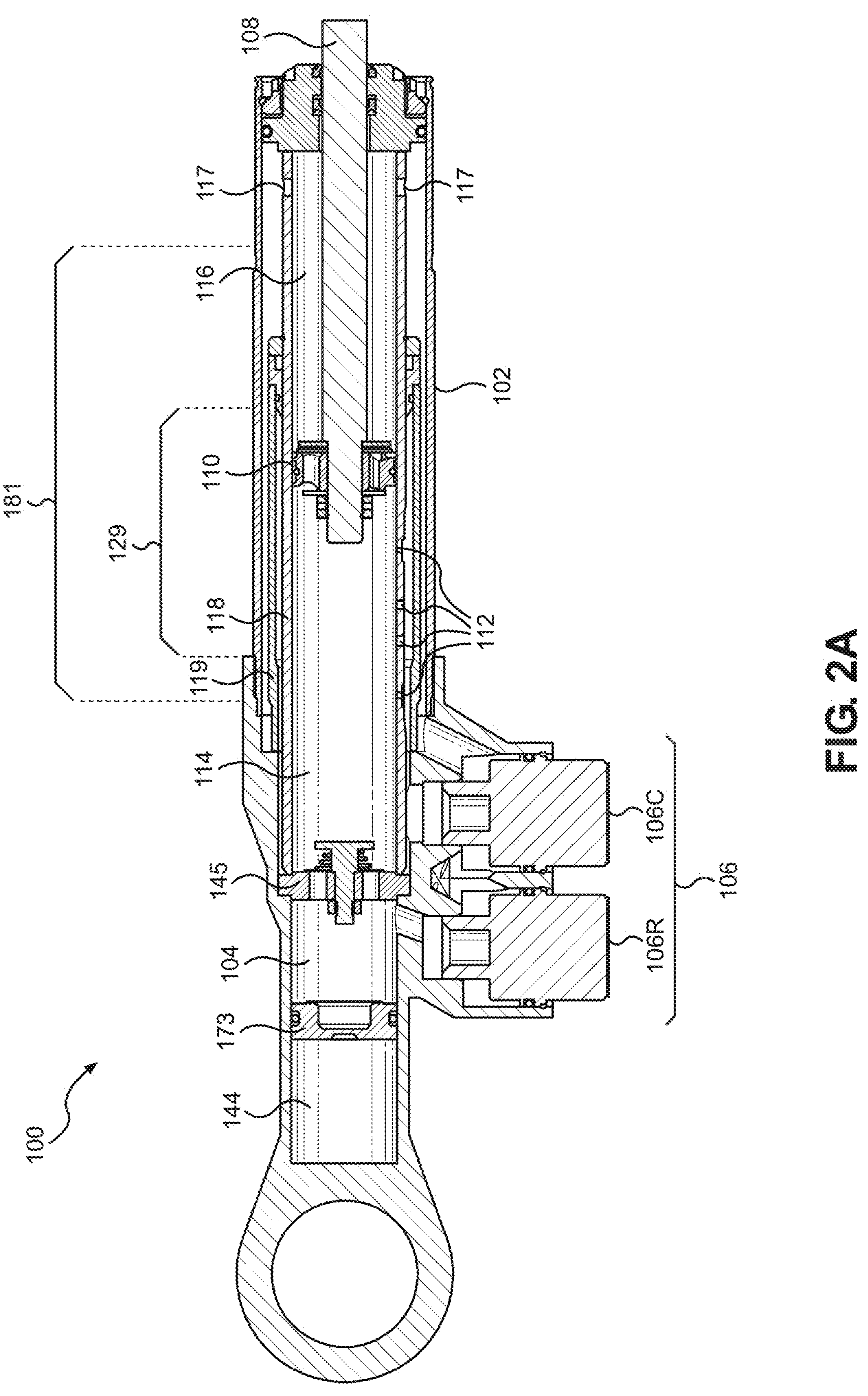
FIG. 2A is a side cut-away view of a shock assembly including a valve assembly, in accordance with an embodiment.

Referring now to FIG. 2A, a side cut-away view of shock assembly 100 including a valve assembly 106 is shown. In one embodiment, FIG. 2A includes compression side check valve 145, reservoir chamber 104, piston 110, rebound valve 106R, and compression valve 106C. Rebound valve 106R is coupled between compression side check valve 145 and IFP 173. Compression side check valve 145 separates compression side 114 from reservoir chamber 104. The rebound flow from rebound side 116 to compression side 114 flows through reflow holes 117 and then the rebound flow paths extends through rebound valve 106R, through the reservoir chamber 104 and through said compression side check valve 145 to said compression side 114.

Valve assembly 106 includes a first valve (e.g., compression valve 106C) and a second valve (e.g., rebound valve 106R). Importantly, it should be noted that in various embodiments of the present invention, compression valve 106C is operated independently of rebound valve 106R. Similarly, in various embodiments of the present invention, rebound valve 106R is operated independently of compression valve 106C. Thus, in various embodiments, the present invention provides independent control of compression and rebound damping of shock assembly 100. A further description of various sensors and a control system used in conjunction with compression valve 106C to control shock assembly 100 and adjust a damping force therein is provided below.

In one embodiment, the compression valve 106C is adjustable (e.g., non-static). In one embodiment, the rebound valve 106R is adjustable (e.g., non-static). In one embodiment, both the compression valve 106C and the rebound valve 106R are adjustable (e.g., non-static).

In one embodiment, compression valve 106C and/or rebound valve 106R are manual, passive, semi-active, active, and/or adaptive valves (that is, they are adjustable and therefore non-static). In one embodiment, one or both of compression valve 106C and/or rebound valve 106R are adjustable manually, electrically, pneumatically, hydraulically, or the like.

Figure 2B:
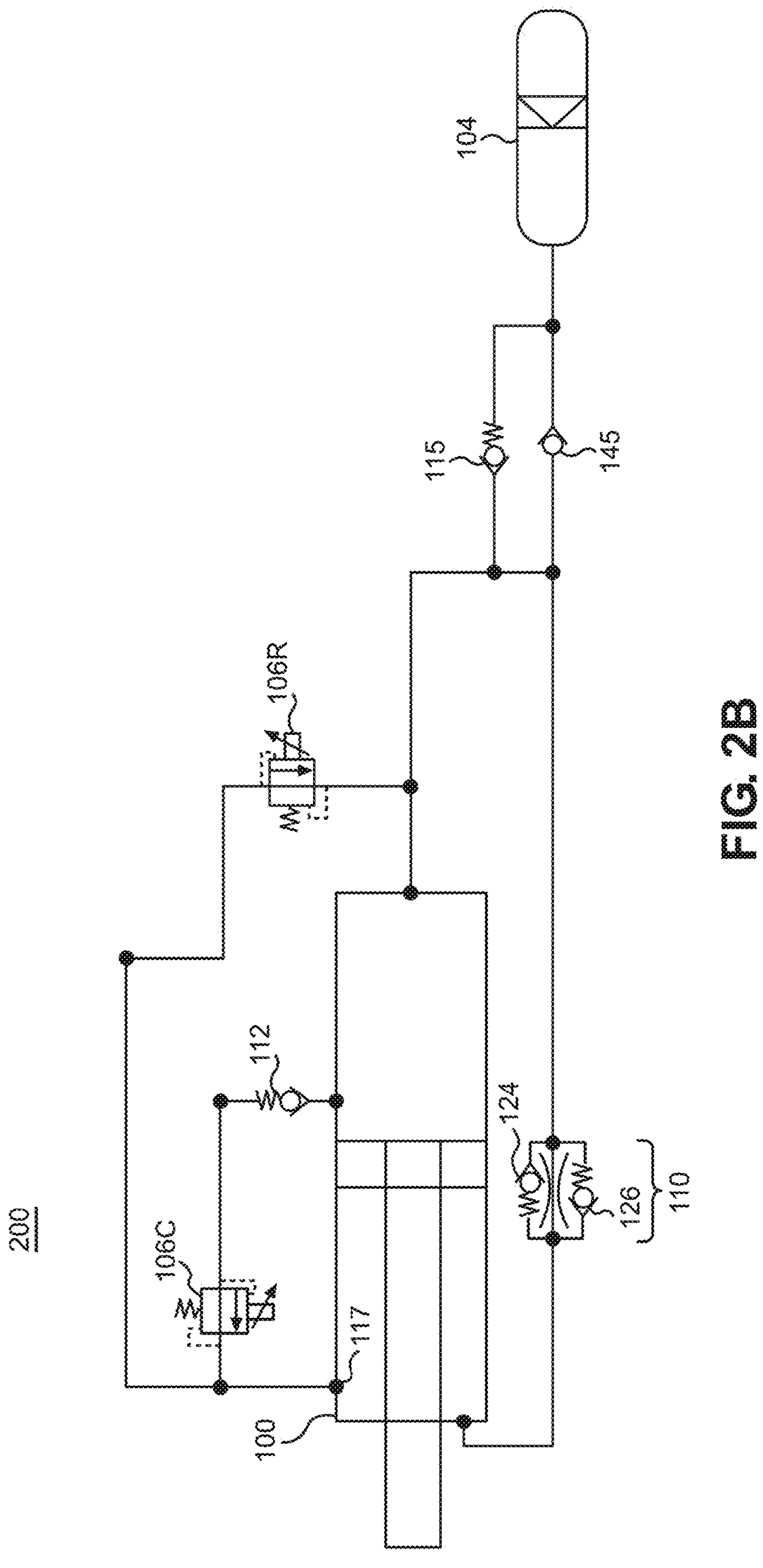
FIG. 2B is a schematic diagram for the shock assembly including a valve assembly, in accordance with an embodiment.

With reference now to FIG. 2B, a schematic diagram 200 for the shock assembly 100 including the valve assembly 106 is shown in accordance with an embodiment. In one embodiment, schematic diagram 200 shows a base valve 115, compression side check valve 145, reservoir chamber 104, compression blow-off valving 124 and rebound blow-off valving 126 through the piston 110, rebound valve 106R coupled between rebound reflow hole(s) 117 and base valve 115 defining the rebound bypass flow path, and compression valve 106C coupled between bypass openings 112 and rebound reflow hole(s) 117 defining the compression bypass flow path.

In one embodiment, in contrast to the layout of FIG. 2A, in FIG. 2B the rebound valve 106R is coupled between rebound side 116 and compression side 114 and defines a rebound bypass flow path that does not include base valve 115. That is, rebound bypass flow path will flow from the rebound side 116 exiting via reflow hole(s) 117, traversing the bypass flow path and returning to the compression side 114.

In one embodiment, moving the compression valve 106C between bypass openings 112 and rebound reflow hole(s) 117 increases the operational control of the shock assembly 100 by allowing the system to control the bypass valves 112 within the ride zone.

With reference now to FIGS. 2A and 2B, shock assembly 100 includes a piston 110 coupled to shaft 108. Damping cylinder 102 includes an annular chamber 118 which surrounds the interior chamber in which piston 110 travels. In one embodiment, annular chamber 118 includes bypass openings 112 which fluidically couple the interior of damping cylinder 102 with annular chamber 118. In one embodiment, bypass openings 112 are position sensitive bypass openings provided along a ride zone 181. In general, ride zone 181 refers to the normal operating range of piston 110 within annular chamber 118.

It will be understood that bypass openings 112 in combination with annular chamber 118 are utilized to achieve position dependent damping in shock assembly 100. That is, damping based on the location of piston 110 with respect to the ride zone 181. Additionally, in some embodiments of the present invention, piston 110 will have valving therein (e.g., compression blow-off valving 124 and rebound blow-off valving 126) to allow fluid to pass through piston 110 during compression movement (e.g., motion of shaft 108 and piston 110 into damping cylinder 102 as shown by arrow 180 of FIG. 4A) and rebound movement (e.g., motion of shaft 108 and piston 110 along damping cylinder 102 as shown by arrow 182 of FIG. 4B).

In one embodiment, such as a twin-tube shock assembly configuration, the compression valve 106C is located in a middle area 129 of the shock assembly damping cylinder 102. For example, the compression valve 106C will pass through the damping cylinder 102 at a point where it can be sealed with the bypass flow path (e.g., flow path 401 shown in FIG. 4A).

In one embodiment, shock assembly 100 is a triple-tube configuration. That is, shock assembly 100 will include a third tube. In one embodiment of the triple-tube layout, the location of the compression valve 106C is located at the body cap area and the three tubes of the triple-tube configuration include the damping cylinder 102, an annular chamber 118, and a bypass chamber 119.

In so doing, the triple-tube configuration changes the bypass fluid pathway of a twin-tube such that the working fluid flows from the compression side 114 through the bypass valves 112 and to the compression valve along a new controlled fluid pathway formed between the annular chamber 118 and the bypass chamber 119. The working fluid then flows from the compression valve 106C to the rebound reflow hole(s) 117 via the twin-tube fluid pathway formed between annular chamber 118 and damping cylinder 102. In one embodiment, the triple-tube layout is used for shock layout purposes, convenience, interference (such as where a compression valve 106C located in the middle area of the shock assembly damping cylinder 102 would interfere with other components of the shock assembly or vehicle, such as a spring, etc.), or the like.

In one embodiment, shock assembly 100 includes a base valve 115, reservoir chamber 104, internal floating piston (IFP) 173, and gas 144. In general, the available fluid volume within annular chamber 118 changes as the shaft 108 moves in and out of the damping cylinder 102 in shock assemblies that do not have a through shaft. For example, the maximum amount of working fluid which can be held within the damping cylinder 102 is limited by the shaft 108. In other words, when the shock assembly 100 is completely compressed such that the shaft 108 is taking up its maximum volume within the damping cylinder 102, the remaining fluid volume can be filled with working fluid. Therefore, when the shaft 108 is at least partially withdrawn from the damping cylinder 102, the reduction in shaft volume within the damping cylinder 102 results in an increase in the amount of available fluid volume within the damping cylinder 102. In a most basic shock assembly, that space is filled with air. Deleteriously, during operation of the shock assembly the motion of the piston within the damping chamber can incorporate the air into the working fluid which is often referred to as emulsion. Basically, during emulsion, as the piston pushes on the working fluid, it also has to push the air bubbles out of the working fluid resulting in a reduced damping response.

This problem is often solved using a gas (such as Nitrogen) and IFP 173 to keep the working fluid separate from the gas 144. For example, in a pure monotube FOX shock the IFP 173 is in-line with the main body separating the working fluid from the gas 144. The problem with this is that it is usually a lower performance shock for several reasons such as, it requires higher gas pressure to prevent cavitation, it usually leads to higher dead lengths depending on the architecture. Therefore, the addition of a base valve 115 is included for higher performance to reduce gas pressures, add variable damping, and prevent cavitation. In different embodiments, base valve 115 is similar to a piston 110 in that it may have holes, shims and a jet in its center and/or a check valve 145. Additionally, base valve 115 can be comprised of electromechanical devices such as solenoids, motors, etc. Often, the base valve 115 is fixed in the damping cylinder 102, usually between the piston 110 and the IFP 173 to create a third chamber therein. Basically, during the compression stroke, the base valve 115 allows the displacement of a volume of working fluid equal to the shaft volume entering the damping cylinder 102, which moves the IFP 173. However, the base valve 115 also maintains the resistance necessary to force working fluid through the piston 110. During the rebound stroke, the gas 144 behind the IFP 173 presses outward and working fluid is able to move through the base valve 115 back into the compression side 114 of damping cylinder 102. Furthermore, base valve 115 can operate in the rebound stroke, reverse to the compression operation.

As such, the base valve 115 allows a decrease (or even elimination) of a pressure of the gas in the shock assembly 100. Moreover, the base valve 115 prevents cavitation in the working fluid, but doesn't increase the force necessary to move the shaft 108. This allows the shock assembly 100 to respond better at low shaft speeds, such as for example, on a smoother surface, where the shaft 108 isn't moving as quickly as it would if the vehicle were traversing a lot of bumps.

Referring still to FIGS. 2A and 2B, as is typically understood, piston 110 at least partially defines a compression side 114 and a rebound side 116 of shock assembly 100. It will be understood that the volume of compression side 114 will vary as the position of piston 110 changes within damping cylinder 102. Similarly, it will be understood that the volume of rebound side 116 will vary as the position of piston 110 changes within damping cylinder 102. Moreover, it will be understood that compression side 114 and/or rebound side 116 may also be defined as including at least a portion of annular chamber 118 depending upon the state (compression or rebound) of shock assembly 100.

Figure 3A:
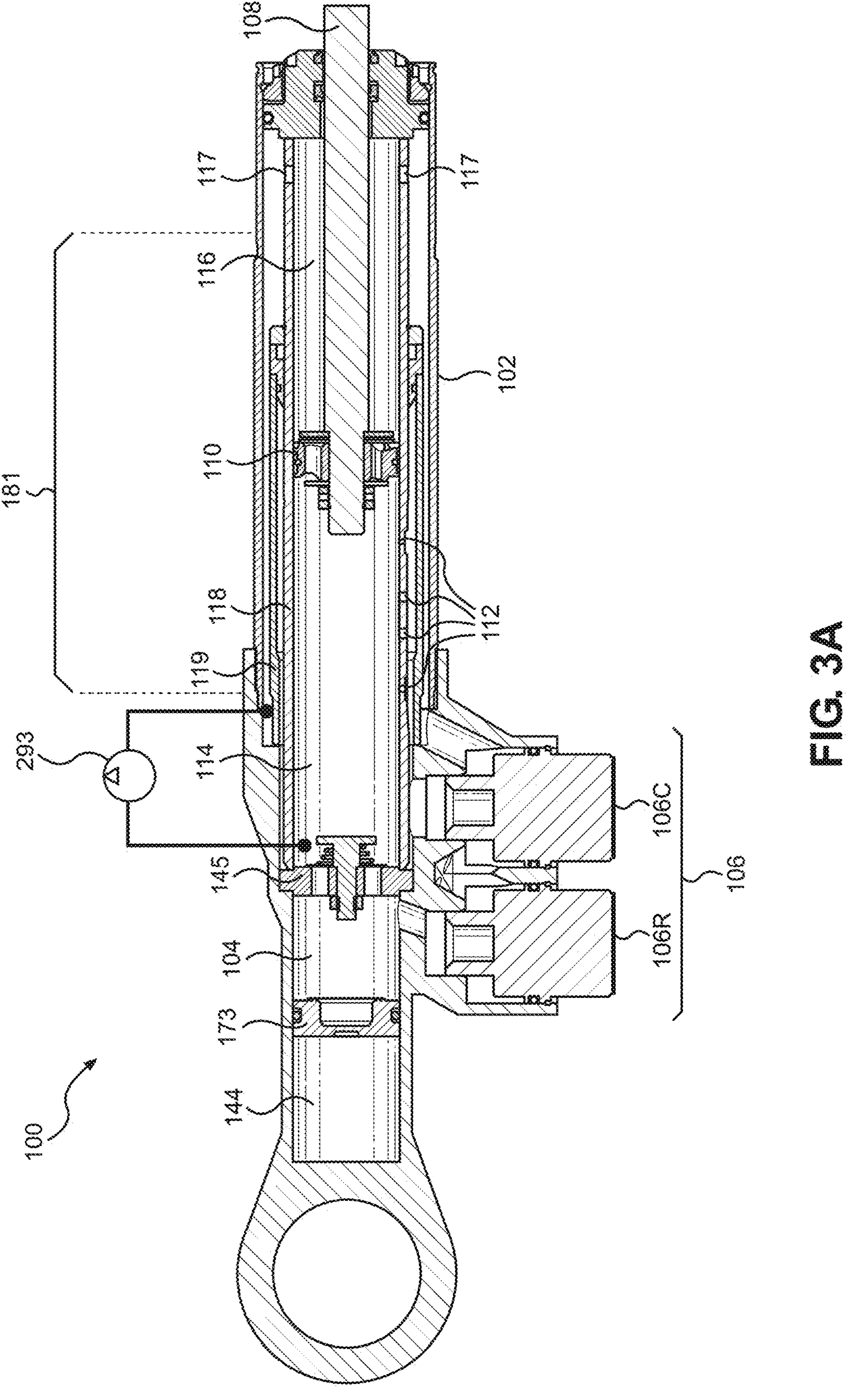
FIG. 3A is a side cut-away view of a shock assembly including a valve assembly and hydraulic pump, in accordance with an embodiment.

With reference now to FIG. 3A, a side cut-away view of a shock assembly including a valve assembly 106 and hydraulic pump 293 is shown in accordance with an embodiment. In one embodiment, the addition of the hydraulic pump 293 circuit allows fluid to be moved from the rebound side 116 to the compression side 114 to increase the overall length of shock assembly 100 and from the compression side 114 to the rebound side 116 to reduce the overall length of shock assembly 100. In one embodiment, the hydraulic pump 293 is operated while the vehicle is moving at no speed or low speeds. In one embodiment, the hydraulic pump 293 can be operated while the vehicle is operating at speed including high speeds (e.g., ≥25 MPH).

Figure 3B:
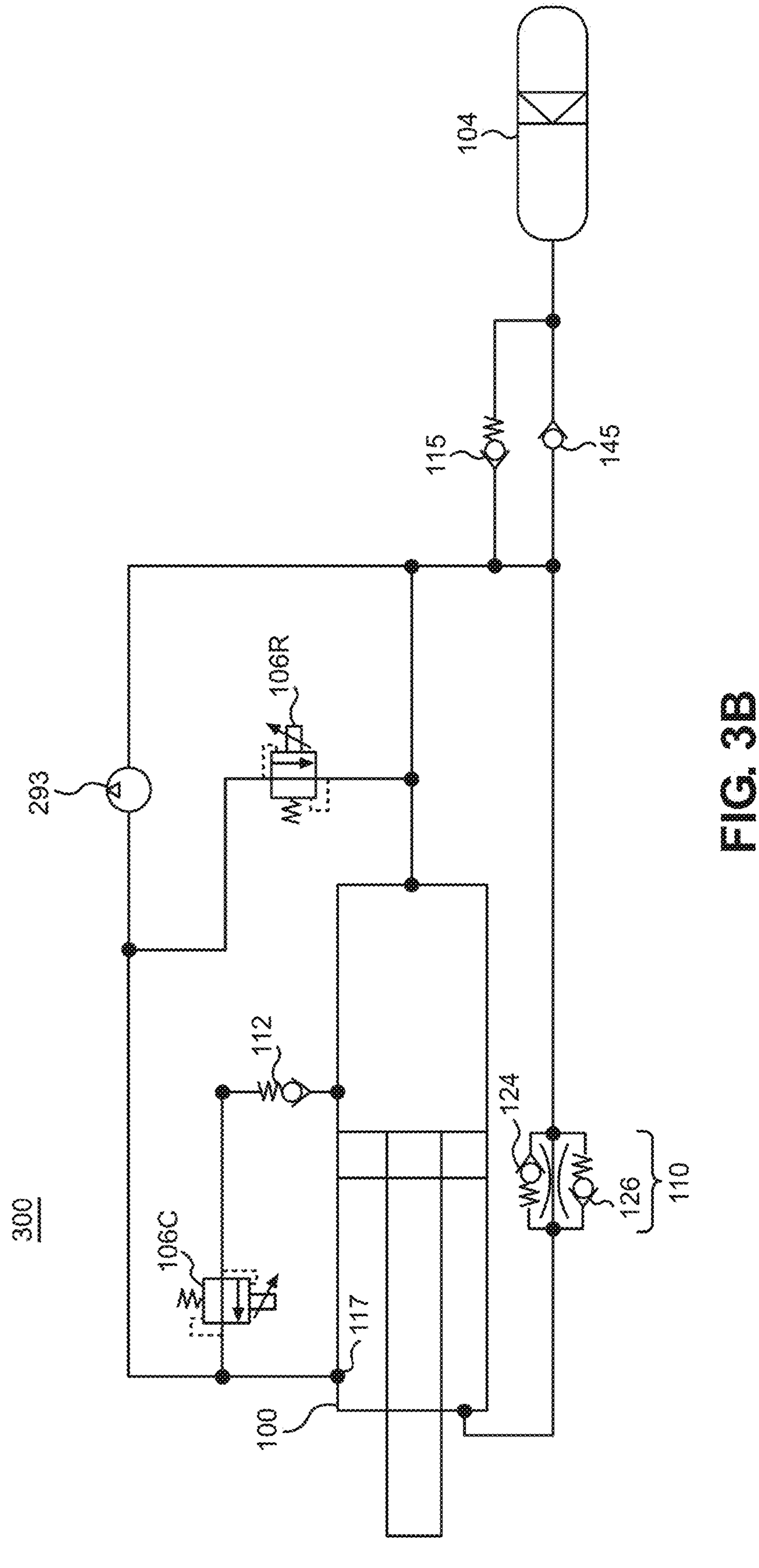
FIG. 3B is a schematic diagram for the shock assembly including a valve assembly and hydraulic pump, in accordance with an embodiment.

FIG. 3B is a schematic diagram 300 for the shock assembly including a valve assembly 106 and hydraulic pump 293 shown in accordance with an embodiment. For purposes of clarity, the components and/or functionality of FIGS. 3A and 3B that are the same or similar to the components and/or functionality already described in FIGS. 2A-2B is not repeated, but instead the entirety of any components and/or functionality discussions provided herein is incorporated by reference.

In one embodiment, hydraulic pump 293 is in parallel with rebound valve 106R. In one embodiment, hydraulic pump 293 allows shock assembly 100 to become a fully active shock assembly with the hydraulic pump 293 able to add energy to the shock assembly system. In one embodiment, hydraulic pump 293 is plumbed in the annular chamber 118 by the base valve 115 (e.g., on the compression side 114) and also in the bypass flow path. In so doing, the hydraulic pump 293 can move the working fluid from the compression side 114 to the rebound side 116 to decrease the overall length of shock assembly 100 by pushing the piston 110 into a compressed location thereby absorbing the length of shaft 108 and causing the overall length of shock assembly 100 to be decreased. Further discussion of the decreased overall length of shock assembly 100 is provided in the discussion of FIGS. 4A and 4B.

In one embodiment, hydraulic pump 293 is plumbed in the annular chamber 118 by the base valve 115 (e.g., on the compression side 114) and also in the bypass flow path. In so doing, the hydraulic pump 293 can move the working fluid from the rebound side 116 to the compression side 114 to increase the overall length of shock assembly 100 by pushing the piston 110 into a rebound location thereby extending shaft 108 and causing the overall length of shock assembly 100 to be increased. Further discussion of the increased overall length of shock assembly 100 is provided in the discussion of FIGS. 5A and 5B.

Figure 3C:
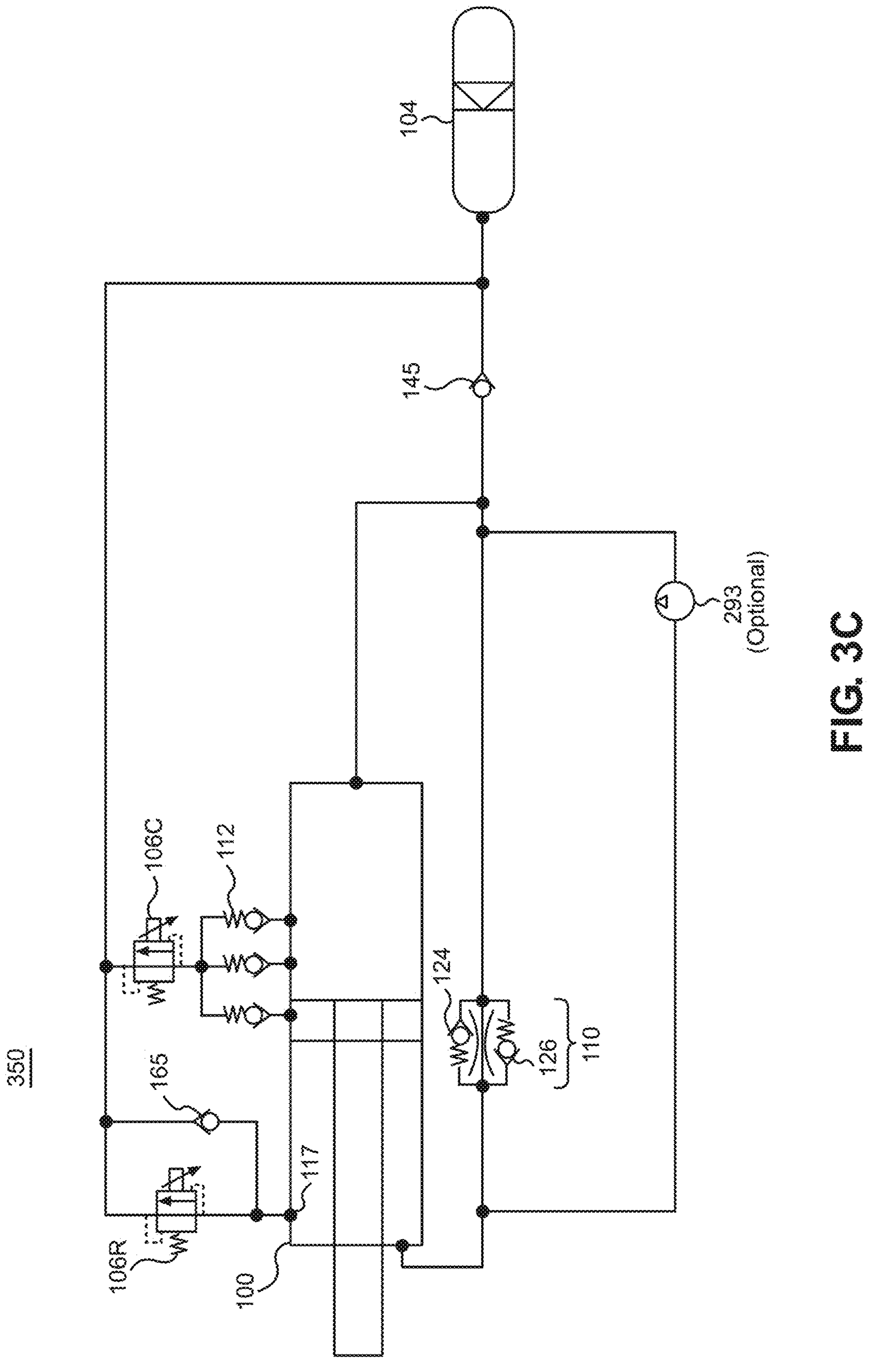
FIG. 3C is a schematic diagram for another embodiment of the shock assembly including a valve assembly and an optional hydraulic pump with a slightly different configuration than FIG. 3A, in accordance with an embodiment.

FIG. 3C is a schematic diagram 350 of another embodiment of the shock assembly 100 including a valve assembly 106 (shown as compression valve 106C and rebound valve 106R) and an optional hydraulic pump 293 with a slightly different configuration than FIGS. 3A and 3B shown in accordance with an embodiment. For purposes of clarity, the components and/or functionality of FIG. 3C that are the same or similar to the components and/or functionality already described in FIGS. 2A-3B is not repeated, but instead the entirety of any components and/or functionality discussions provided herein is incorporated by reference.

In one embodiment, schematic diagram 350 illustrates a triple-tube shock configuration with no base valve. In one embodiment, the shock assembly 100 configuration of schematic diagram 350 has a compression side check valve 145 and a rebound side check valve 165. Another change to the shock assembly 100 configuration of schematic diagram 350 is both the compression valve 106C and the rebound valve 106R connect/dump to the reservoir chamber 104 (or a "pre-chamber" if the system includes that option). In one embodiment, schematic diagram 350 again uses the position-sensitive bypass flow (e.g., bypass openings 112) instead of the normal flow for the compression.

One advantage is the removal of cross-talk between compression and rebound if/when the main piston is not flowing. Another advantage of schematic diagram 350 is the simpler configuration (e.g., no base valve) with a better pressure balance.

Figure 4A:
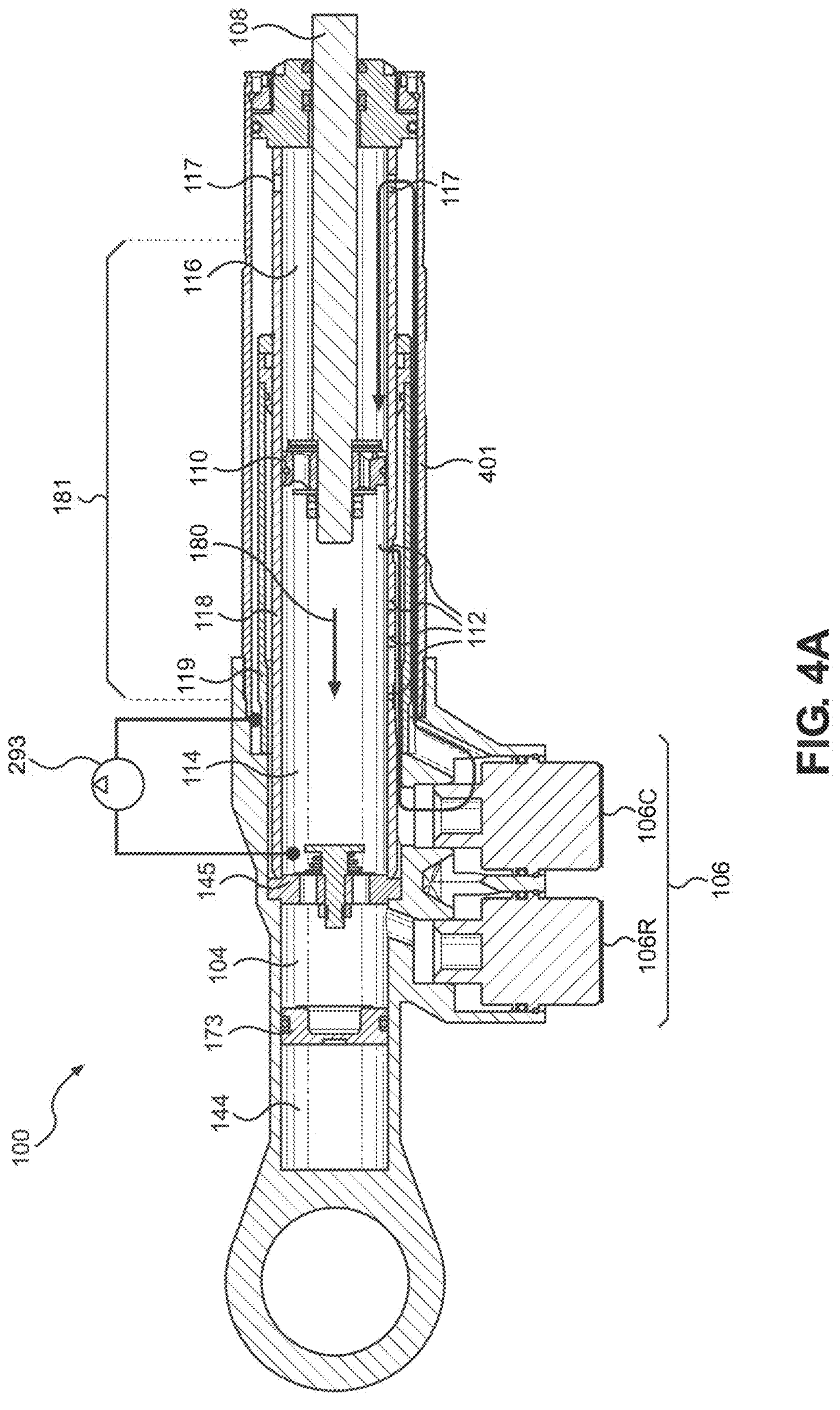
FIG. 4A is a side cut-away view of a shock assembly depicting a commanded compression fluid flow path, in accordance with an embodiment.

Referring now to FIG. 4A, a side cut-away view of a shock assembly 100 during compression is shown in accordance with an embodiment. For purposes of clarity, the components and/or functionality of FIG. 4A that are the same or similar to the components and/or functionality already described in FIGS. 2A-2B and 3A-3B is not repeated, but instead the entirety of any components and/or functionality discussions provided herein is incorporated by reference.

During the compression of shock assembly 100, as piston 110 is pushed into compression side 114 (shown by arrow 180) fluid will flow along compression flow path 401. In general, flow path 401 shows the working fluid moving from compression side 114 into bypass openings 112, to the compression valve 106C along the fluid pathway formed between the annular chamber 118 and the bypass chamber 119. The working fluid then flows from the compression valve 106C to the rebound reflow hole(s) 117 via the bypass pathway formed between annular chamber 118 and damping cylinder 102 and ultimately into rebound side 116 through reflow hole(s) 117. Additionally, in some embodiments, during compression, fluid will also pass from compression side 114 to rebound side 116 by passing through compression blow-off valving 124 in piston 110.

As shaft 108 enters damping cylinder 102, fluid is displaced by the additional volume of shaft 108 which enters damping cylinder 102. The fluid displaced by shaft 108 is referred to as shaft displaced fluid. The shaft displaced fluid is typically provided to reservoir chamber 104.

The inclusion of bypass openings 112 and annular chamber 118, along with controlling shaft displaced fluid flow, enables the present embodiment to concurrently achieve position dependent damping and compression damping control even during low speed movement of shaft 108 and piston 110.

Figure 4B:
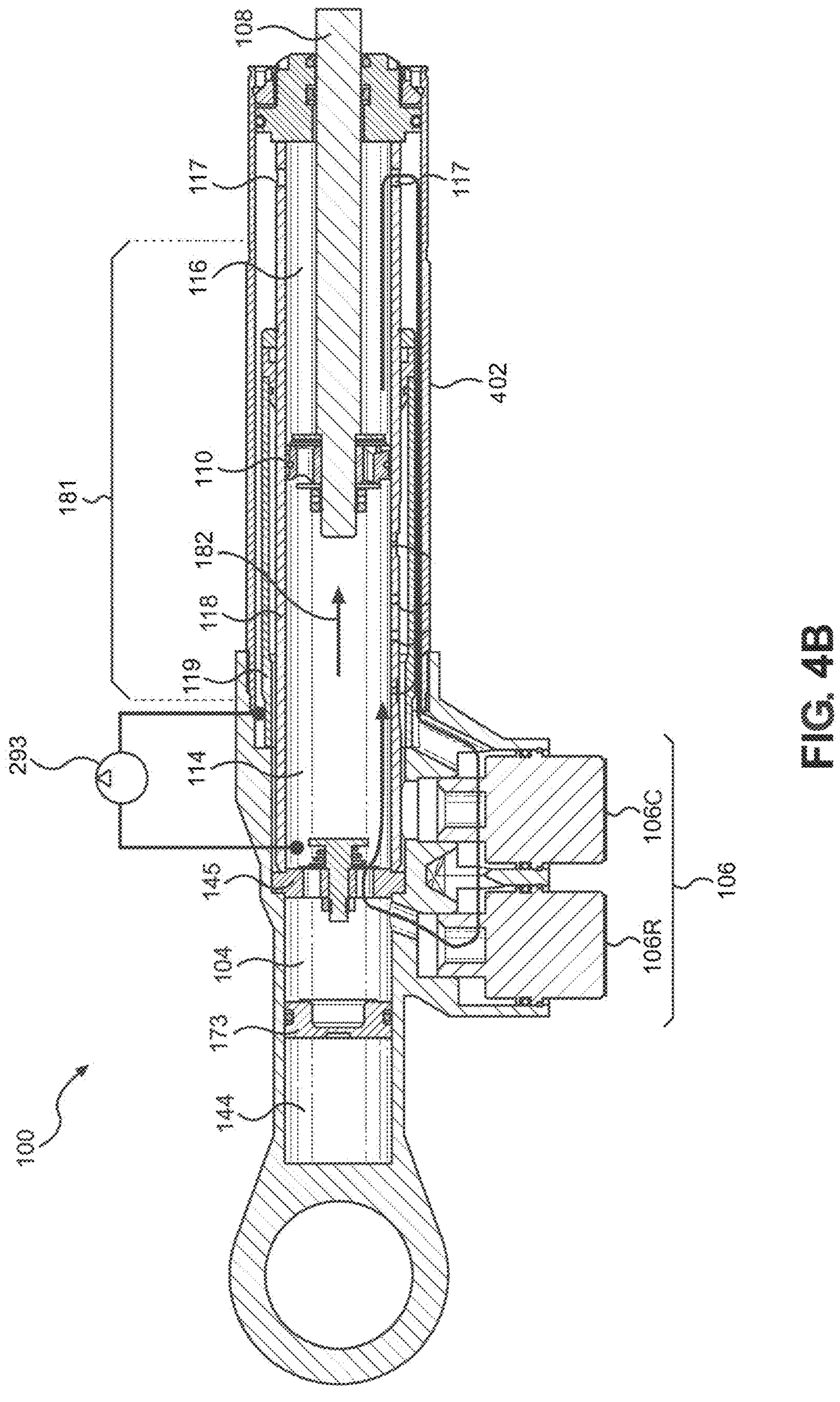
FIG. 4B is a side cut-away view of a shock assembly depicting a command extension fluid flow path, in accordance with an embodiment.

Referring now to FIG. 4B, a side cut-away view of a shock assembly 100 during rebound is shown in accordance with an embodiment. For purposes of clarity, the components and/or functionality of FIG. 4B that are the same or similar to the components and/or functionality already described in FIGS. 2A-2B and 3A-3B is not repeated, but instead the entirety of any components and/or functionality discussions provided herein is incorporated by reference.

During rebound of shock assembly 100 (i.e. movement of shaft 108 out of damping cylinder 102 as shown by arrow 182), fluid will typically flow from rebound side 116 through annular chamber 118 and ultimately into compression side 114. Additionally, in some embodiments, during rebound, fluid will also pass from rebound side 116 to compression side 114 by passing through rebound blow-off valving 126 in piston 110. In some embodiments, during rebound, fluid is prevented from flowing through piston 110 such that all fluid must flow through annular chamber 118 and ultimately into compression side 114 above piston 110. In some embodiments of the present invention, bypass openings 112 are closed during rebound such that fluid is prevented therefrom. Additionally, as shaft 108 exits damping cylinder 102, fluid must replace the volume of shaft 108 which has exited damping cylinder 102. The fluid which replaces the volume of shaft 108 which has exited damping cylinder 102 is typically provided from reservoir chamber 104.

In one embodiment, during rebound, fluid flows from rebound side 116 through reflow hole 117 into annular chamber 118 through rebound valve 106R and into the compression side 114 via base valve 115. In one embodiment, rebound valve 106R is configured to control flow of fluid from rebound side 116 of damping cylinder 102 and into compression side 114 of damping cylinder 102 along the fluid flow path indicated by flow path 402. In one embodiment, during rebound, fluid flows only through rebound valve 106R and back into compression side 114 of damping cylinder 102 via base valve 115. That is, in the present embodiment, rebound fluid does not flow through compression valve 106C. Thus, in the present embodiment, compression valve 106C does not reside in fluid flow path 402 extending from rebound side 116 of damping cylinder 102 into compression side 114.

In one embodiment, since compression valve 106C does not impede the flow of fluid during rebound, rebound valve 106R experiences a less pressurized flow of fluid than would be experienced if fluid flow was subsequently impeded, during rebound, by compression valve 106C. As a result, rebound valve 106R can be smaller than a valve which must control impeded fluid flow or greater fluid flow rates. These factors allow valve assembly 106 to be smaller and less expensive than a valve assembly that is required to handle impeded fluid flow or high fluid flow rates during rebound.

Figure 5A:
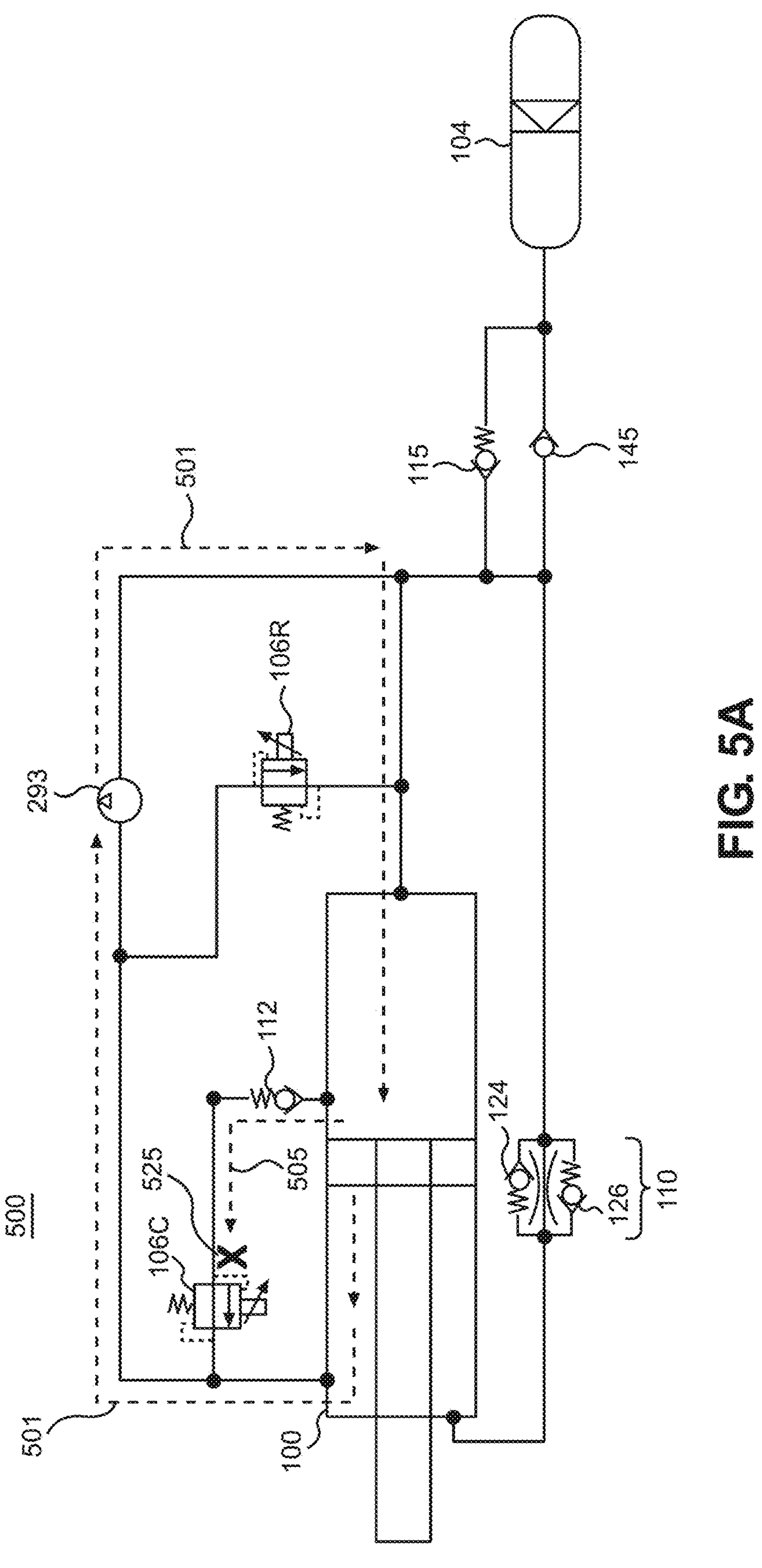
FIG. 5A is a schematic diagram for the shock assembly during a command extension, in accordance with an embodiment.

With reference now to FIG. 5A, a schematic diagram 500 for the shock assembly 100 depicting a command extension is shown in accordance with an embodiment. For purposes of clarity, the components and/or functionality of FIG. 5A that is the same or similar to the components and/or functionality already described in FIGS. 2A-4B is not repeated, but instead the entirety of any components and/or functionality discussions provided herein is incorporated by reference.

During the command extension of shock assembly 100 the hydraulic pump 293 will pump the working fluid from rebound side 116 (via the bypass region) and into compression side 114. At the same time, compression valve 106C will be closed as shown by X 525. By blocking the bypass flow from compression side 114, the working fluid will push piston 110 into rebound side 116.

In other words, to provide full extension of the shock assembly 100, the compression loop is closed (e.g., fluid path 505 is closed) and the hydraulic pump 293 moves fluid from the rebound side 116 to the compression side 114 causing the piston 110 to move into the rebound side 116 thereby increasing the overall length of the shock assembly (e.g., eyelet-to-eyelet).

Some reasons for increasing the length of the shock assembly 100 include, but are not limited to, rock crawling (or other technical traverse locations/environments), river crossing, deep sand/mud crossing and the like. For example, during rock crawling (or other technical traverse locations/environments), deep sand and mud traversal and the like a higher vehicle stance will reduce the chance for the undercarriage or other portions of the vehicle to impact objects (e.g., rocks, debris, stumps, limbs, etc.), high center (or otherwise be hung up on) an obstacle or in deep mud/sand, etc. Similarly, in water crossings, a higher vehicle stance will reduce water ingress as portions of the vehicle (e.g., seating, engine, air intakes, etc.) will be at a higher ride height than the usual sag ride height.

In one embodiment, the extended length of the shock assembly 100 is maintained as long as the hydraulic pump 293 is operating and the compression valve 106C is closed. For example, although the fluid has been pumped from the rebound side 116 and is maintained in the compression side 114 by the closed compression valve 106C stopping fluid flow through the position sensitive bypass valves 112, in one embodiment, the preload on the compression blow-off valve 124 of the piston 110 is set below the pressure generated by the weight of the suspended portion of the vehicle. In so doing, the vehicle will add enough pressure to the system to overcome the blow-off pressure requirements of the compression blow-off valve 124 of the piston 110. As such, if the hydraulic pump 293 is turned off, the shock assembly will settle and return to its established sag.

In one embodiment, the extended length of the shock assembly (e.g., the increased ride height) is relatively maintained as long as the compression valve 106C is closed even if the hydraulic pump 293 is turned off. That is, in one embodiment, the preload on the compression blow-off valve 124 of the piston 110 is set to a higher pressure than the pressure generated by the weight of the suspended portion of the vehicle. As such, the shock assembly 100 will remain extended until either the compression valve 106C is opened or an event occurs that increases the compression side 114 pressure enough to blow-off the compression blow-off valve 124 such that fluid will pass through the valving in the piston 110.

For example, the fluid has been pumped from the rebound side 116 and is maintained in the compression side 114 by the closed compression valve 106C stopping fluid flow through the position sensitive bypass valves 112. In addition, the preload on the compression blow-off valve 124 of the piston 110 is set to a higher pressure than the pressure generated by the weight of the suspended portion of the vehicle. Thus, the increased ride height is maintained while the vehicle is stopped, moving, etc.

However, when the vehicle encounters an event (e.g., impact, bump, hole, etc.) large enough to cause the compression side 114 to generate enough pressure to overcome the blow-off pressure of the compression blow-off valve 124. Some of the fluid will move through the compression blow-off valve 124 from the compression side 114 to the rebound side 116 and the overall shock assembly 100 length is reduced.

In one embodiment, in response to the reduced length of the overall shock assembly 100 (and thus a reduced ride height for the portion of the vehicle affected by the given shock assembly). A sensor (or user, etc.) determines the extended length of the shock assembly 100 has decreased and provides a signal to activate the hydraulic pump 293 thereby returning the shock assembly 100 to its extended position.

In one embodiment, in response to the determination that the extended length of the shock assembly 100 had decreased, the hydraulic pump 293 on some or all other shock assemblies of the vehicle is also activated to ensure those shock assemblies are still at (or are returned to) their proper extended length.

In another embodiment, a sensor (or user, etc.) determines the extended length of the shock assembly 100 had decreased and sends a signal to unlock the compression valve 106C thereby allowing the shock assembly 100 to return to its normal operating length and thus the vehicle to return to its sag ride height.

In one embodiment, in response to the determination that the extended length of the shock assembly 100 had decreased, the compression valve 106C on some or all other shock assemblies of the vehicle would also be unlocked to ensure the shock assemblies all returned to their normal operating length.

Additional information regarding sag and sag setup can be found in U.S. Pat. No. 8,838,335 which is incorporated by reference herein, in its entirety.

Figure 5B:
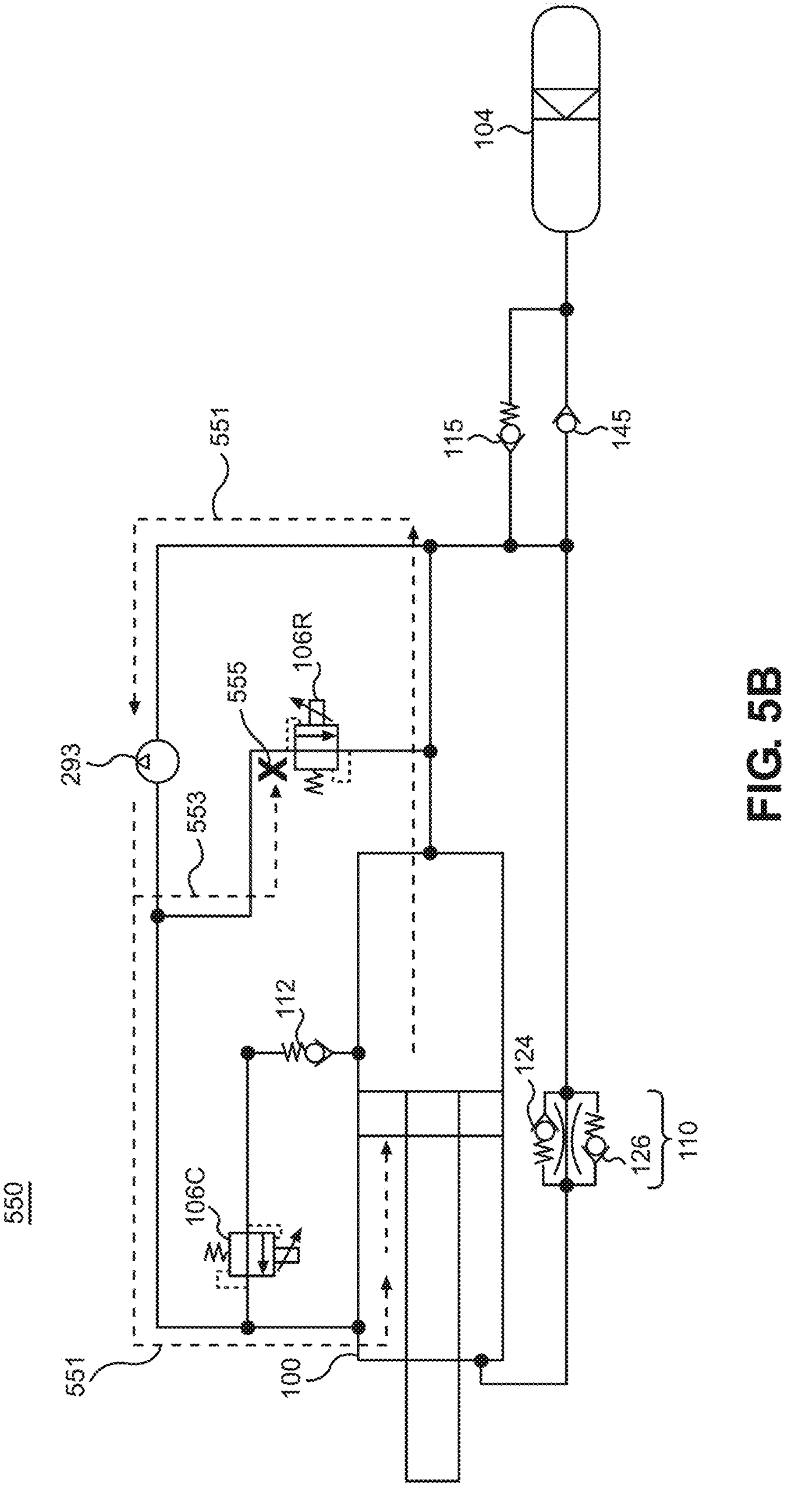
FIG. 5B is a schematic diagram for the shock assembly depicting the commanded compression, in accordance with an embodiment.

With reference now to FIG. 5B, a schematic diagram 550 for the shock assembly 100 depicting a command compression is shown in accordance with an embodiment. For purposes of clarity, the components and/or functionality of FIG. 5B that is the same or similar to the components and/or functionality already described in FIGS. 2A-5A is not repeated, but instead the entirety of any components and/or functionality discussions provided herein is incorporated by reference.

During the command compression of shock assembly 100 the hydraulic pump 293 will pump the working fluid from compression side 114 into rebound side 116 via the compression bypass region. At the same time, rebound valve 106R will be closed as shown by X 555. By blocking the flow path 553, piston 110 is pushed into compression side 114, as shown by arrow 180.

In other words, the rebound flow path 553 is closed (by closing 555 rebound valve 106R) and the hydraulic pump 293 will move fluid from the compression side 114 to the rebound side 116 causing the piston 110 to move into the compression side 114 thereby reducing the overall length of the shock assembly 100 (e.g., eyelet-to-eyelet).

Some reasons for decreasing the length of shock assembly 100 include, but are not limited to, rock crawling, other technical traverse locations/environments, and the like. For example, during rock crawling (or other technical traverse locations/environments), one tire (e.g., the front right tire) of the vehicle will be on a rock. As such, the front left tire could be suspended in the air due to the suspension setup. In one embodiment, the shock assembly 100 (or assemblies) associated with the front right tire could be reduced in length to allow the front left tire to be back in contact with the terrain.

In one embodiment, in addition to reducing the overall length of the shock assembly 100 (or assemblies) associated with the front right tire, the overall length of the shock assembly 100 (or assemblies) associated with the front left tire would be increased to allow the tires to both be in contact with the terrain while reducing the overall decrease in ride height of the vehicle.

In one embodiment, the reduced length of the shock assembly 100 (e.g., the decreased ride height) is maintained as long as the hydraulic pump 293 is operating and the rebound valve 106R is closed. For example, although the fluid has been pumped from the compression side 114 and is maintained in the rebound side 116 by the closed rebound valve 106R stopping fluid flow through the rebound pathway (s), in one embodiment, the preload on the rebound blow-off valve 126 of the piston 110 is set below the pressure generated by the springs of the suspension of the vehicle. In so doing, the springs will add enough pressure to the system to overcome the blow-off pressure requirements of the rebound blow-off valve 126 of the piston 110. As such, if the hydraulic pump 293 is turned off, the shock assembly 100 will extend and return to its established sag.

In one embodiment, the reduced length of the shock assembly 100 (e.g., the decreased ride height) is relatively maintained as long as the rebound valve 106R is closed even if the hydraulic pump 293 is turned off. For example, in one embodiment, the preload on the rebound blow-off valve 126 of the piston 110 is set to a higher pressure than the pressure generated by the springs of the suspension of the vehicle. As such, the shock assembly 100 will remain compressed until either the rebound valve 106R is opened or an event occurs that increases the rebound side 116 pressure enough to blow-off the rebound blow-off valve 126 such that fluid will pass through the valving in the piston 110.

For example, an amount of fluid has been pumped from the compression side 114 to the rebound side 116 via hydraulic pump 293. Moreover, the fluid pressure differential is maintained in the rebound side 116 by the closed rebound valve 106R stopping fluid flow through the rebound flow path. In addition, the rebound valving of the piston 110 is also set high enough such that the springs (or the like) do not add enough pressure to the system to overcome the blow-off pressure of the rebound blow-off valve 126. Thus, the reduced ride height is maintained while the vehicle is stopped, moving, etc.

However, when the vehicle encounters an event that causes the rebound side 116 fluid to have enough pressure to overcome the blow-off pressure requirements of the rebound blow-off valve 126 of the piston 110, some of the fluid will move through the piston valving from the rebound side 116 to the compression side 114 and increase the overall shock assembly 100 length.

In one embodiment, in response to the increased length of the shock assembly 100 (and thus an increase in the ride height for the portion of the vehicle affected by the shock assembly 100). A sensor (or user, etc.) determines the overall length of the shock assembly 100 has increased and provides a signal to activate the hydraulic pump 293 to return the shock assembly 100 to its reduced overall length.

In one embodiment, in response to the determination that the overall length of the shock assembly 100 had increased, the hydraulic pump 293 on some or all other shock assemblies of the vehicle will also be activated to ensure those shock assemblies remain at (or return to) their proper reduced length.

In another embodiment, a sensor (or user, etc.) would determine the overall length of the shock assembly 100 had increased and would send a signal to unlock the rebound valve 106R thereby allowing the shock assembly 100 to return to its normal operating position and thus the vehicle to return to its sag ride height.

In one embodiment, in response to the determination that the overall length of the shock assembly 100 had increased, the rebound valve 106R on some or all other shock assemblies of the vehicle will also be unlocked to ensure those additional shock assemblies are also returned to their normal operating length.

In one embodiment, the hydraulic pump 293 operational requirements will allow the vehicle to continuously adjust the overall shock assembly 100 length. For instance, in the example where the overall length of the shock assembly 100 (or assemblies) associated with the front right tire are decreased to allow both front tires to be in contact with the terrain, as the front right tire moves past the obstacle that tire would be suspended above the terrain. As such, the overall length of the shock assembly 100 (or assemblies) associated with the front right tire would be returned to their normal sag length (or even increased as needed) to ensure the front right tire was in contact with the terrain.

Similarly, in the example where the overall length of the shock assembly 100 (or assemblies) associated with the front right tire are decreased while the overall length of the shock assembly 100 (or assemblies) associated with the front left tire are increased to allow the tires to both be in contact with the terrain; as the front right tire moves past the obstacle that tire will be suspended above the terrain. As such, the overall length of the shock assembly 100 (or assemblies) associated with the front right tire would be returned to their normal sag length.

If the front right tire was not in contact with the terrain after returning to the normal sag height, in one embodiment, the overall length of the shock assembly 100 (or assemblies) associated with the front right tire is increased as needed to ensure the front right tire was in contact with the terrain. In one embodiment, if the front right tire was not in contact with the terrain after returning to the normal sag height, the overall length of the shock assembly 100 (or assemblies) associated with the front left tire is decreased such that the front right tire is in contact with the terrain.

In one embodiment, the overall length of the shock assembly 100 (or assemblies) associated with the front right tire is increased and the overall length of the shock assembly 100 (or assemblies) associated with the front left tire is decreased.

Although the above examples utilize the right front and left tires, it should be appreciated that the adjustments could be for the suspension of a single wheel, the suspension of two wheels (front-to-front, rear-to-rear, front-to-rear, cross configuration (e.g., left front-to-right rear, right front-to-left rear, etc.)), the suspension of three wheel (four wheel, etc.) and/or a combination thereof. For example, in a slow difficult terrain environment, the suspension for one, some, or all of the wheels (tracks, skis, hulls, etc.) could be adjusted independently, in cooperation, automatically, etc. as the vehicle traverses the difficult terrain environment. The adjustments could be automatic, electronic, modal system, based on user input, a combination thereof, and the like.

In one embodiment such as a suspension setup where a wheel has more than one shock assembly 100 associated therewith, an increase adjustment to ride height would utilize an increase in the overall shock length of only one (or a plurality of) the shock assemblies.

In one embodiment such as a suspension setup where a wheel has more than one shock assembly 100 associated therewith, an adjustment to ride height (e.g., increase and/or decrease) would utilize an increase in the overall shock length of all of the shock assemblies associated with the given wheel.

In one embodiment the increasing or decreasing of the overall length of the shock assembly 100 is a set distance. For example, assuming the normal operating sag length for a vehicle results in a shock assembly 100 length of 36 inches, the minimum operational length of the shock assembly 100 is 30 inches, and the maximum operational extended length of the shock assembly 100 is 42 inches. If the increasing and/or decreasing is a set distance, then when activated, the hydraulic pump 293 would either reduce the overall shock assembly 100 length to 30 inches (e.g., reducing the vehicle ride height and/or decreasing the distance of the wheel from the suspended portion of the vehicle 6 inches) or increase the overall shock assembly 100 length to 42 inches (e.g., increasing the vehicle ride height and/or increasing the distance of the wheel from the suspended portion of the vehicle 6 inches).

In one embodiment, the increasing or decreasing of the overall size of the shock assembly 100 is adjustable. For example, assuming again the normal operating sag length for a vehicle results in a shock assembly 100 length of 36 inches, the minimum operational length of the shock assembly 100 is 30 inches, and the maximum operational extended length of the shock assembly 100 is 42 inches. If the increasing and/or decreasing is adjustable, then when activated, the hydraulic pump 293 would be able to adjust the overall length of the shock assembly 100 to values between the minimum operational length of the shock assembly 100 and the maximum operational length of the shock assembly 100 (e.g., 30-42 inches).

In one embodiment, the adjustable distance of the shock assembly 100 is determined by a sensor, a user, or the like. For example, a sensor may utilize wheel spin, suspension hang, imagery, or the like to determine that a wheel is in the air. In one embodiment, the hydraulic pump 293 is automatically (or manually) activated to increase the operational length of the shock assembly 100 for the wheel in the air. In one embodiment, the hydraulic pump 293 will stop increasing the operational length of the shock assembly 100 when a sensor (or the like) determines the wheel is in contact with the terrain. For example, the hydraulic pump 293 will stop increasing the operational length of the shock assembly 100 once it is determined that the wheel has contacted the terrain and is providing some amount of support for the vehicle (e.g., 20% of normal support, 50%, etc.) or once the maximum operational length of the shock assembly 100 is reached.

Similarly, a sensor determines a left rear wheel is in the air. In one embodiment, the hydraulic pump 293 is automatically (or manually) activated to decrease the operational length of the shock assembly 100 for the left front wheel. In one embodiment, the hydraulic pump 293 will stop decreasing the operational length of the shock assembly 100 for the left front wheel when a sensor (or the like) determines the left rear wheel is in contact with the terrain. For example, the hydraulic pump 293 will stop decreasing the operational length of the shock assembly 100 for the left front wheel once it is determined that the left rear wheel has contacted the terrain and is providing some amount of support for the vehicle (e.g., 10% of normal support, 40%, 80%, etc.) or once the minimum operational length of the shock assembly 100 for the left front wheel is reached.

Figure 6A:
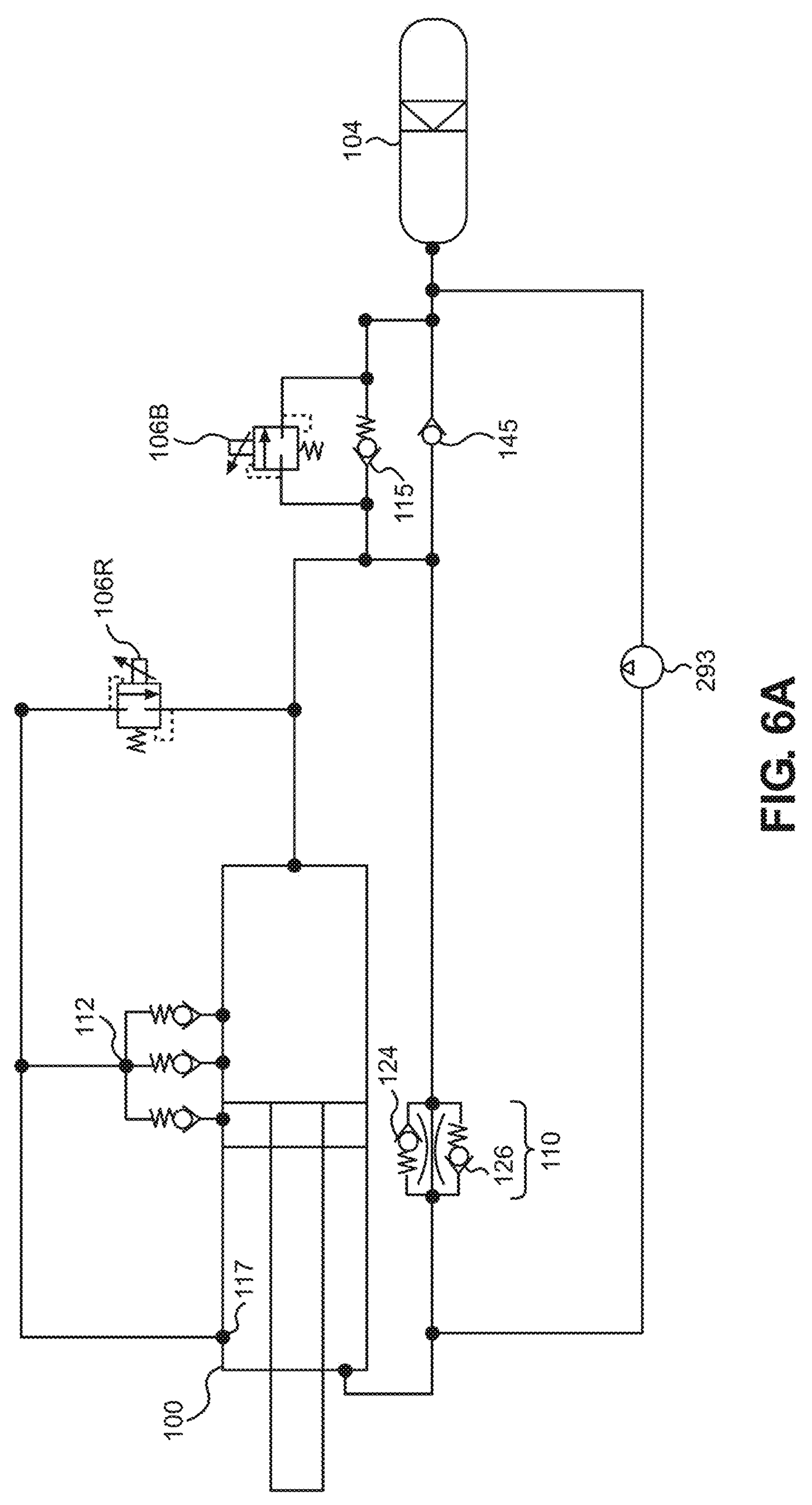
FIG. 6A is a schematic diagram of another configuration of a shock assembly including a valve assembly and a hydraulic pump, in accordance with one embodiment.

With reference now to FIG. 6A, a schematic diagram of a shock assembly 100 including a valve assembly 106 and a hydraulic pump 293 is shown in accordance with one embodiment. For purposes of clarity, the components and/or functionality of FIG. 6A that are the same or similar to the components and/or functionality already described in FIGS. 2A-5B is not repeated, but instead the entirety of any components and/or functionality discussions provided herein is incorporated by reference.

In one embodiment, hydraulic pump 293 is connected from the reservoir chamber 104 to the rebound side 116. In one embodiment, hydraulic pump 293 pumps fluid from the reservoir chamber 104 into the rebound side 116 to add force to both rebound and compression strokes.

In one embodiment, utilizing hydraulic pump 293 allows for active operation of the shock assembly 100, e.g., adding energy to the system, not merely absorbing. In one embodiment, FIG. 6A includes rebound valve 106R. In one embodiment, the first valve is an adjustable base valve 106B (instead of the compression valve 106C). In one embodiment, setting one of the valves (e.g., rebound valve 106R or base valve 106B) to soft/open and the other (e.g., rebound valve 106R or base valve 106B) to hard/closed, allows the pump to act in only the compression or rebound stroke. In one embodiment, by connecting the hydraulic pump 293 from the reservoir chamber 104 to the rebound side 116, compression is provided using the shaft area/base valve 115, so it also doesn't interfere with position sensitivity.

In one embodiment, adjustable base valve 106B is manual, passive, semi-active, active, and/or an adaptive valve. In one embodiment, adjustable base valve 106B is adjustable manually, electrically, pneumatically, hydraulically, or the like.

Figure 6B:
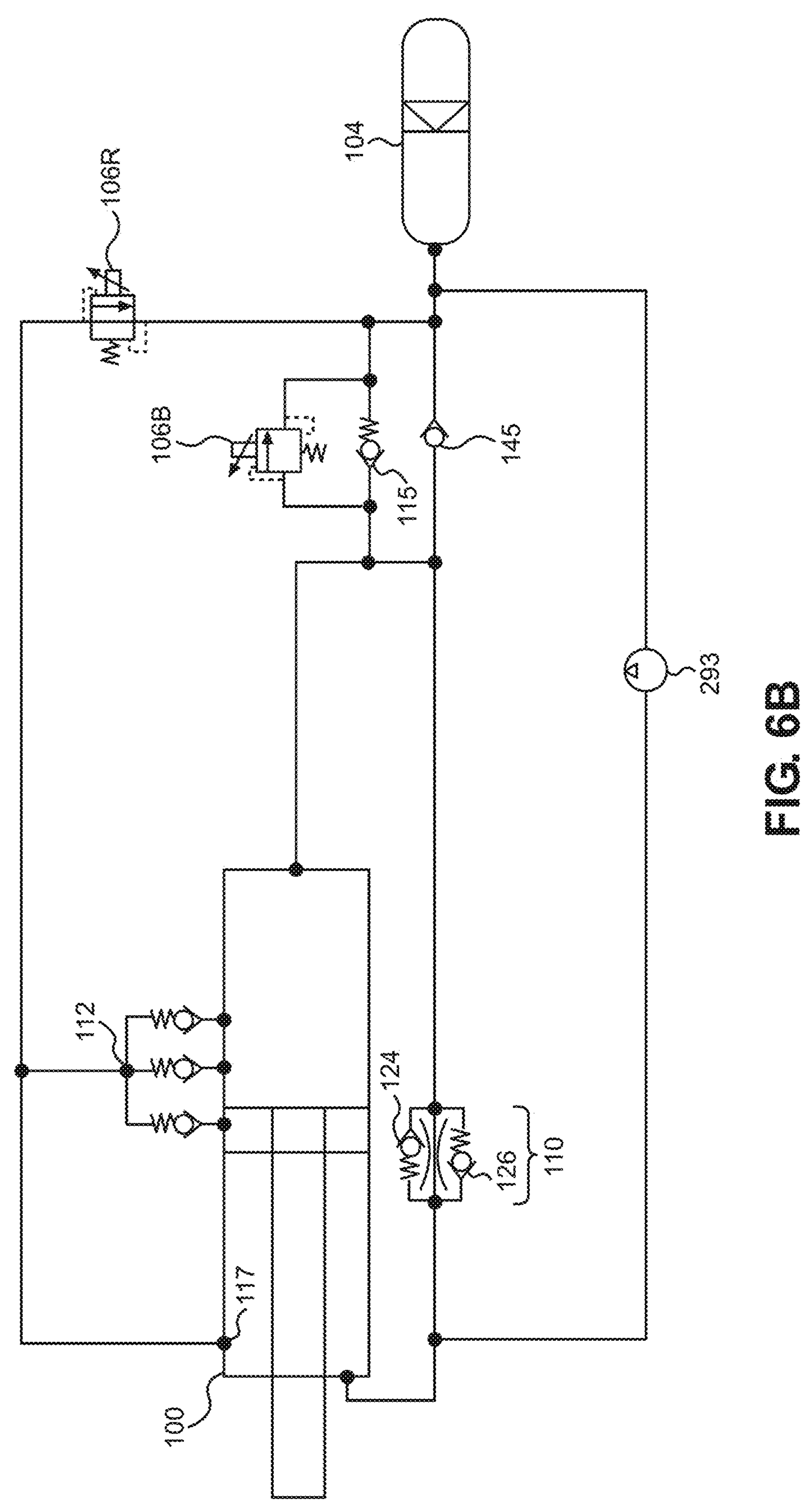
FIG. 6B is a schematic diagram of another configuration of a shock assembly including a valve assembly and a hydraulic pump, in accordance with one embodiment.

With reference now to FIG. 6B, a schematic diagram of a shock assembly 100 including a valve assembly 106 and a hydraulic pump 293 is shown in accordance with one embodiment. For purposes of clarity, the components and/or functionality of FIG. 6B that are the same or similar to the components and/or functionality already described in FIGS. 2A-6A is not repeated, but instead the entirety of any components and/or functionality discussions provided herein is incorporated by reference. In one embodiment, the rebound valve of FIG. 6A is moved to a different location as shown in the schematic of FIG. 6B.

Additional structure and operation of the various components of FIGS. 6A and 6B are described in further detail in U.S. Pat. Nos. 10,737,546 and 11,472,252 which are incorporated herein by reference in their entirety.

3-Port Adjuster Configuration

Figure 7A:
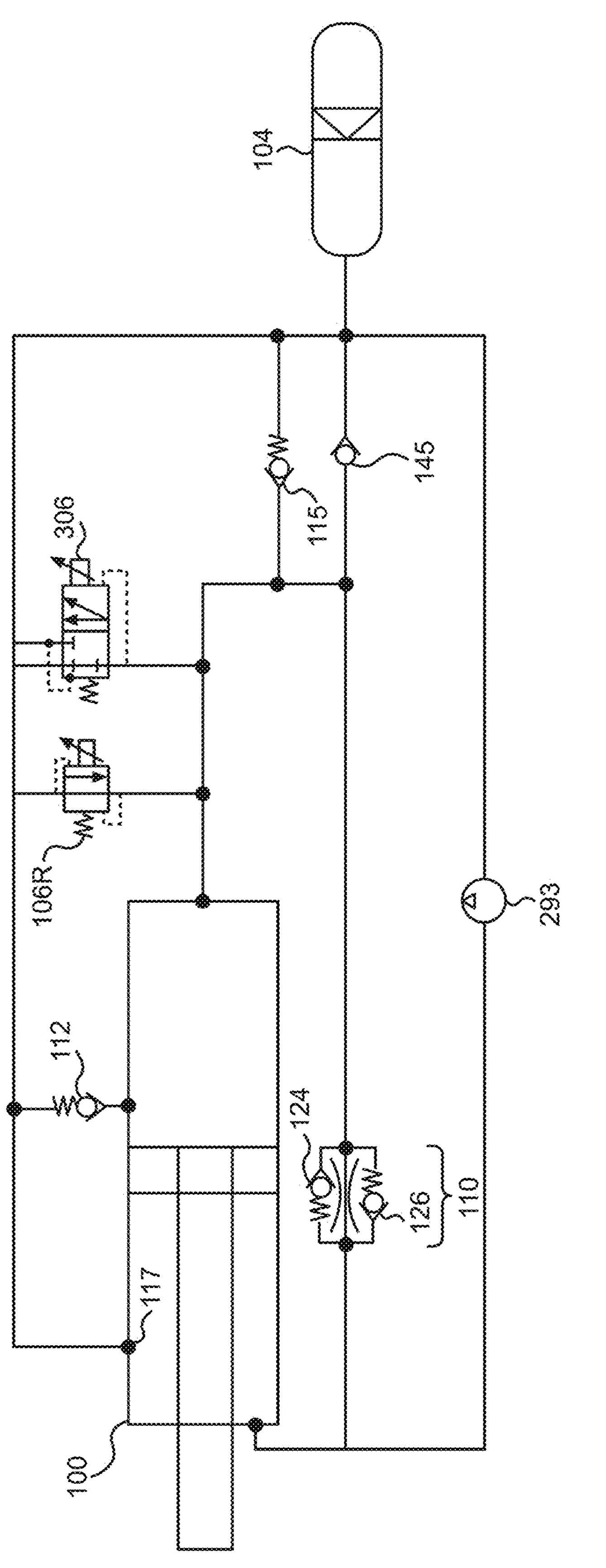
FIG. 7A is a schematic diagram of a shock assembly including a valve assembly with a 3-port adjuster and a hydraulic pump, in accordance with one embodiment.

Referring now to FIG. 7A, a schematic diagram of shock assembly 100 including a valve assembly 106 with a three-port bypass adjuster valve 306 and a hydraulic pump 293 is shown in accordance with one embodiment. In one embodiment, three-port bypass adjuster valve 306 is acting as a semi-active compression valve. In general, a three-port bypass adjuster valve 306 is a valve system that has one port fluidly coupled with the compression side 114, one port fluidly coupled with rebound side 116, and one port fluidly coupled with the reservoir (or reservoir chamber 104). In one embodiment, the 3-port adjuster is used to control compression and/or rebound aspects of the damper. In one embodiment, the 3-port adjuster has a larger control range for the same pressure balance.

Figure 7B:
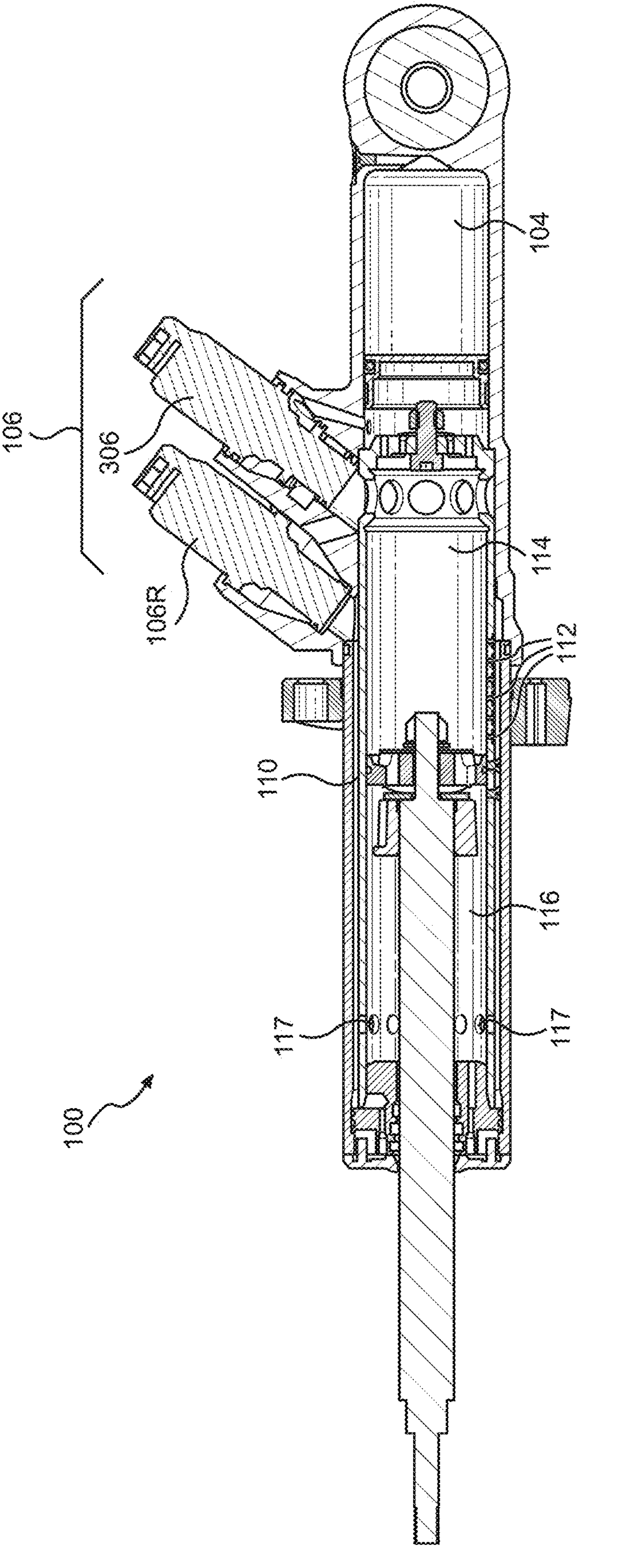
FIG. 7B is a sectional view of the 3-port adjuster in the shock assembly with reflow holes, in accordance with an embodiment, in accordance with one embodiment.

Referring now to FIG. 7B, a sectional view of the three-port bypass adjuster valve 306 in shock assembly 100 with reflow holes 117 is shown in accordance with an embodiment. In one embodiment, the main piston bypass (both compression and rebound) go through the reflow holes 117. FIG. 7B also shows bypass valves 112 (shown in FIGS. 10A-10B). In one embodiment, during rebound, the shims of bypass valves 112 close up and prevent any fluid flow therethrough. In contrast, during compression, the shims of bypass valves 112 open and fluid can flow out of the compression side 114, through the bypass to the reflow holes 117, and back into the rebound side 116.

In the following discussions, except for the differentiations identified herein, the components of the shock assembly of FIGS. 7A and 7B are similar to those previously described herein, and as such, the discussion of the operation of the shock assembly, other than as affected by the three-port bypass adjuster valve 306, is not repeated for purposes of clarity. However, Additional examples, details, and descriptions of a shock absorber/damper can be found in U.S. Pat. No. 10,576,803, the content of which is incorporated by reference herein, in its entirety. Additional examples, details, and descriptions of position-sensitive shock absorber/damper, can be found in U.S. Pat. No. 6,296,092, the content of which is incorporated by reference herein, in its entirety. Additional examples, details, and descriptions of adjustable compression and/or rebound damping, preload, crossover, bottom-out, and the like for a shock absorber/damper can be found in U.S. Pat. No. 10,036,443, the content of which is incorporated by reference herein, in its entirety.

With reference now to FIGS. 7A and 7B, in one embodiment, there are position-sensitive bypass valves 112 that are active only in the ride zone 181 (of FIGS. 2A-5B). In one embodiment, rebound valve 106R is optional. In one embodiment, rebound valve 106R is a direct acting valve. In one embodiment, hydraulic pump 293 is connected from the reservoir chamber 104 to the rebound side 116. In one embodiment, hydraulic pump 293 pumps fluid from the reservoir chamber 104 into the rebound side 116 to add force to both rebound and compression strokes.

In one embodiment, utilizing hydraulic pump 293 allows for active operation of the shock assembly 100, e.g., adding energy to the system, not merely absorbing. In one embodiment, setting one of the valve assemblies 106 (e.g., rebound valve 106R or three-port bypass adjuster valve 306) to soft/open and the other (e.g., rebound valve 106R or three-port bypass adjuster valve 306) to hard/closed, allows the hydraulic pump 293 to act in only the compression or rebound stroke. In one embodiment, by connecting the hydraulic pump 293 from the reservoir chamber 104 to the rebound side 116, compression is provided using the shaft area/base valve 115, so it also doesn't interfere with position sensitivity.

Additional structure and operation of the various components of FIGS. 7A and 7B are described in further detail in U.S. patent application Ser. No. 17/588,890 (pub. 2022-0242186) which is incorporated herein by reference in its entirety.

Additional active and semi-active valve features and examples are described and shown in U.S. Pat. Nos. 8,627,932; 8,857,580; 9,033,122; 9,120,362; and 9,239,090 the contents of which are incorporated by reference herein, in their entirety.

Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Figure 8:
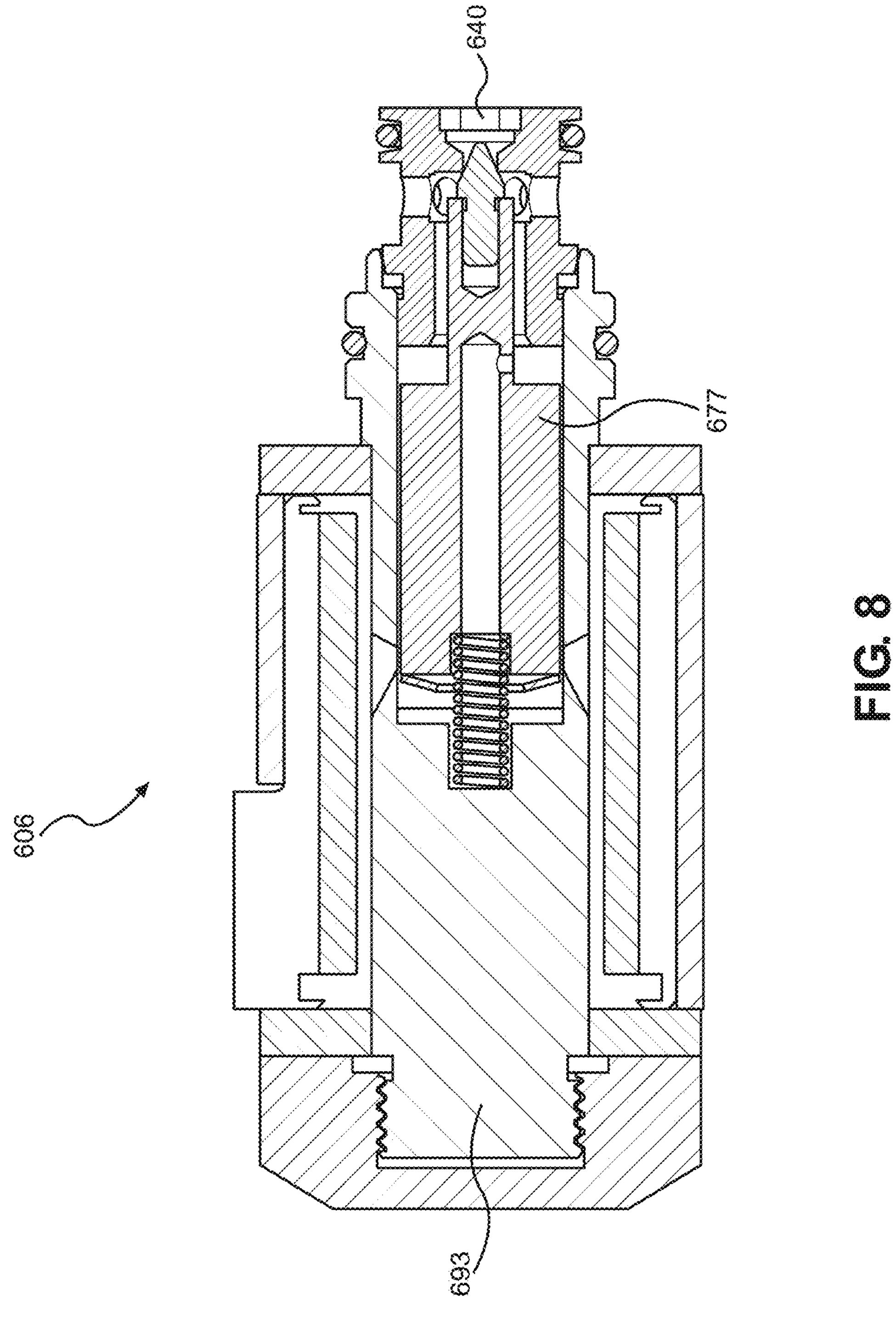
FIG. 8 is a section view of an active or semi-active valve, in accordance with an embodiment.

With reference now to FIG. 8, a section view of a non-static valve 606 is shown in accordance with an embodiment. In general, non-static valve 606 illustrates a basic operation of an active (or solenoid) valve such as compression valve 106C and rebound valve 106R. In one embodiment, when the coil is energized in the non-static valve 606, the armature 677 and pole piece 693 are both magnetized, reducing the spring preload. Additional active and semi-active valve features and examples are described and shown in U.S. Pat. Nos. 8,627,932; 8,857,580; 9,033,122; 9,120,362; and 9,239,090 the content of which are incorporated by reference herein, in their entirety.

In one embodiment, transducers located at the suspension damper measure piston rod velocity (piston rod velocity transducer), and piston rod position (piston rod position transducer), are used to determine when the coil should be energized in the active or semi-active valve. Additional examples and embodiments for transducer-operated arrangement for measuring piston rod speed and velocity are described in U.S. Pat. Nos. 9,623,716 and 10,036,443 the content of which is incorporated by reference herein, in its entirety.

In one embodiment, while transducers located at the suspension damper measure piston rod velocity (piston rod velocity transducer), and piston rod position (piston rod position transducer), a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Additional examples and embodiments of wheel speed transducers are described in U.S. Pat. Nos. 9,033,122; 9,452,654; 10,040,329; 10,047,817; 10,060,499 the content of which are incorporated by reference herein, in their entirety.

Figure 9A:
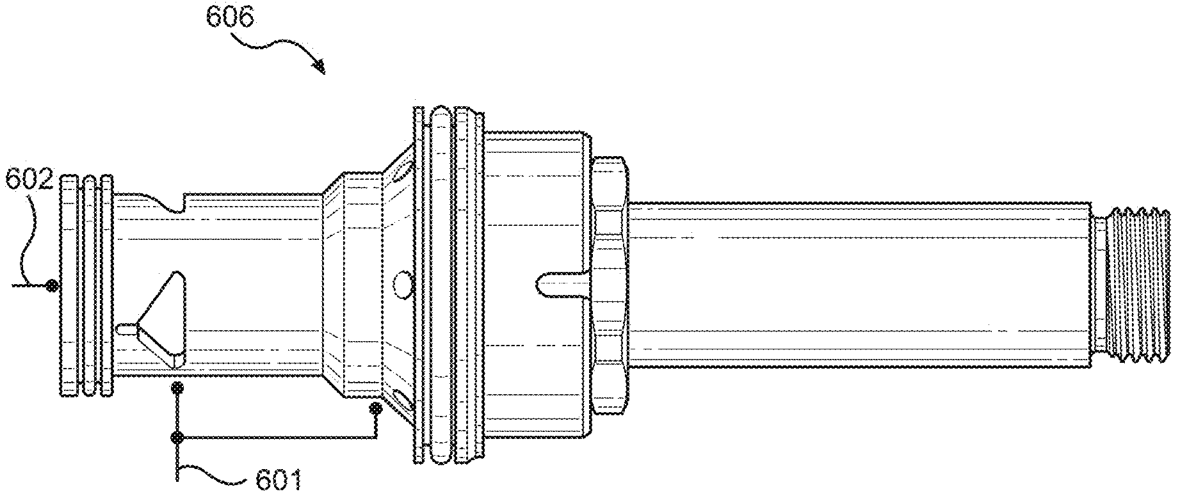
FIG. 9A is a side view of a frequency dependent 2-stage single valve 2-port non-static valve, in accordance with an embodiment.

FIG. 9A is a side view of a 2-stage single valve 2-port non-static valve 606 shown in accordance with an embodiment. In one embodiment, 2-stage single valve 2-port non-static valve 606 is frequency dependent. In one embodiment, the frequency dependent 2-port valve includes a compression side port 601 and a rebound side port 602.

Figure 9B:
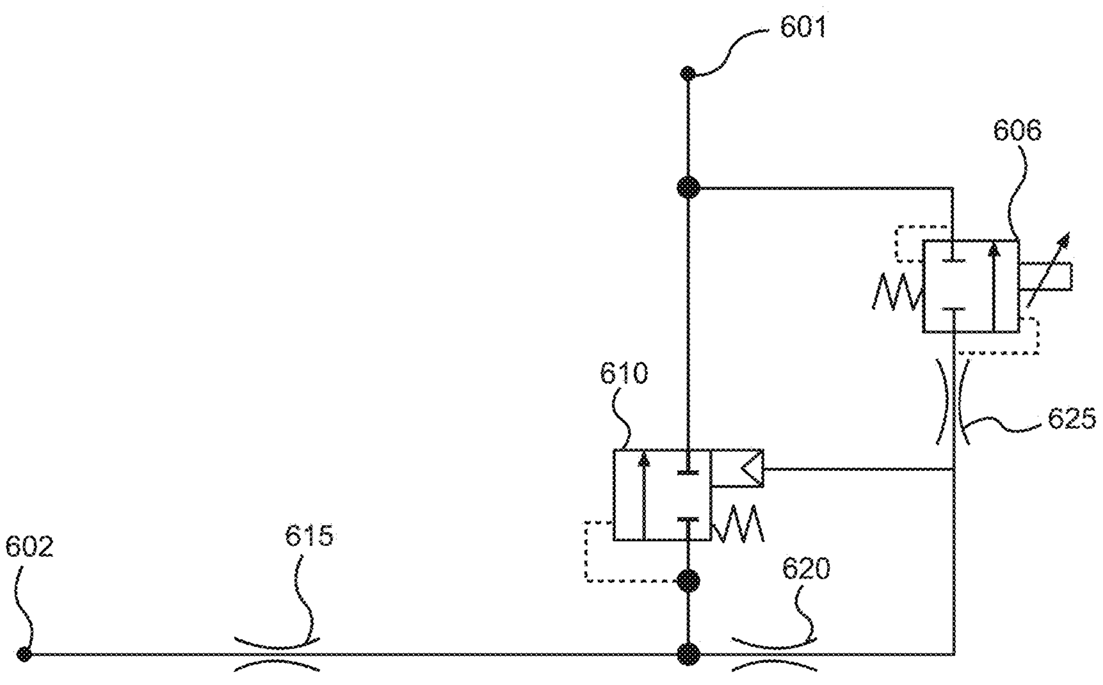
FIG. 9B is a schematic diagram for the frequency dependent 2-stage single valve 2-port non-static valve of FIG. 9A, in accordance with an embodiment.

FIG. 9B is a schematic diagram for the frequency dependent 2-stage single valve 2-port non-static valve 606 of FIG. 9A shown in accordance with an embodiment. In one embodiment, the schematic diagram includes an optionally tunable main stage inlet 615 providing a fluid flow pathway via the rebound side port 602, a spool 610 providing a fluid flow pathway to/from the compression side port 601, a spool orifice 620, an optionally tunable solenoid inlet orifice 625, and a pilot solenoid valve 605 providing another fluid flow path via the compression side port 601. In one embodiment, spool orifice 620 is a current primary tunable orifice. In one embodiment, optionally tunable solenoid inlet orifice 625 is used with pressure balanced high-flow pilot valves. In one embodiment, optionally tunable main stage inlet 615 may be used with smaller shocks to increase high speed forces. In one embodiment, the pilot solenoid valve 605 could be replaced with a different type of adjuster, such as a mechanical, pneumatic, hydraulic, and the like.

Figure 9C:
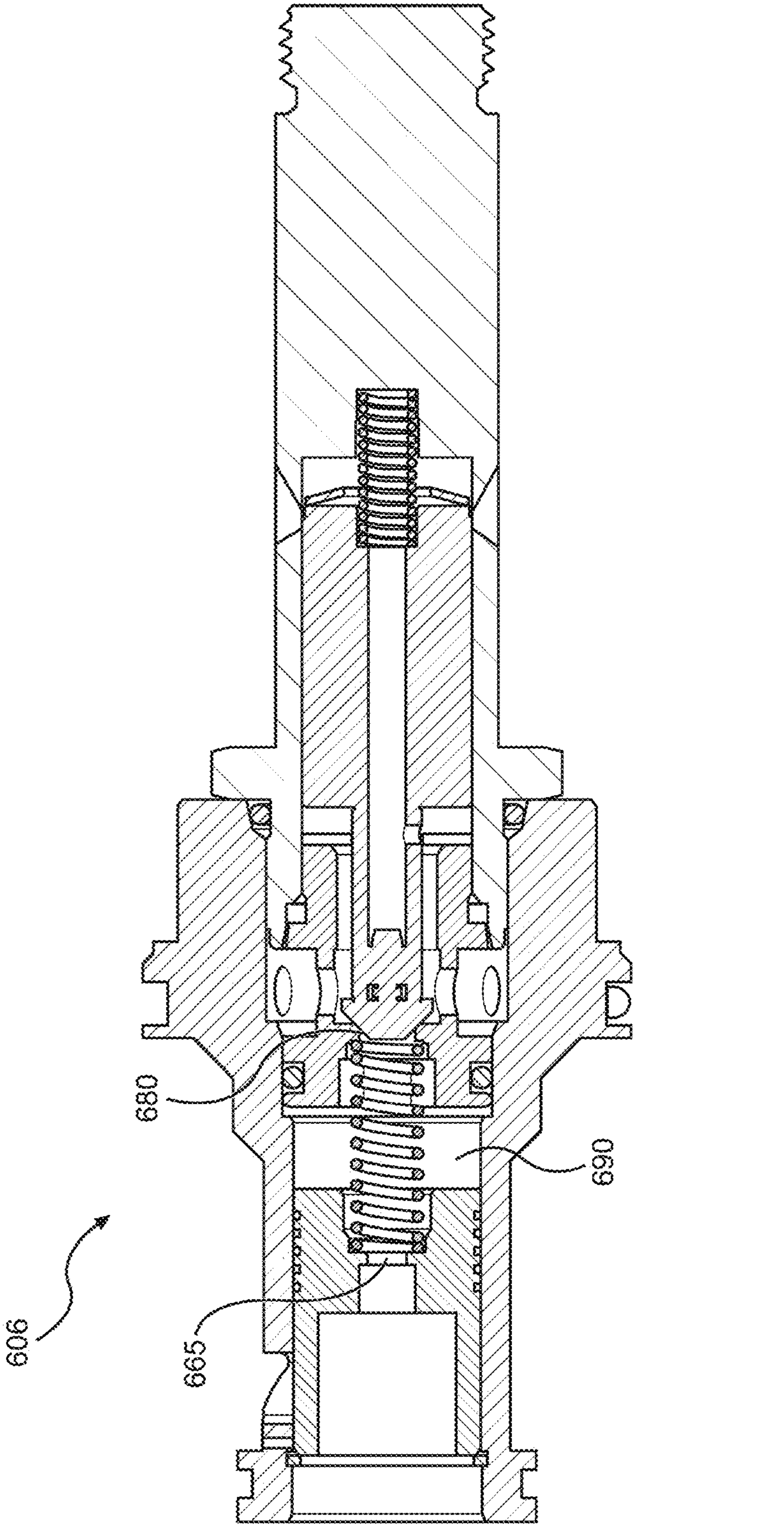
FIG. 9C is a frequency dependent 2-stage single valve 2-port non-static valve, in accordance with an embodiment.

In FIG. 9C, a frequency dependent 2-stage single valve 2-port non-static valve 606 is shown in accordance with an embodiment. In one embodiment, frequency dependent 2-stage single valve 2-port non-static valve 606 benefits from a pilot inlet 665 (or inlets) that is larger than the pilot valve orifice 680 (or orifices). In one embodiment, by using a (e.g., non-standard or oversized) pilot inlet 665 that is larger than the pilot valve orifice 680, the pilot chamber 690 of frequency dependent 2-stage single valve 2-port non-static valve 606 will feedback on itself providing frequency dependent damping. For example, wheel shake frequencies are typically around 10 hz while a vehicles natural frequencies are typically in the 20-30 hz region (frame modes, body mounts, bushings, etc.). The frequency dependent 2-stage single valve 2-port non-static valve 606 is able to be tuned to provide damping for one or more of those frequencies.

Figure 10B:
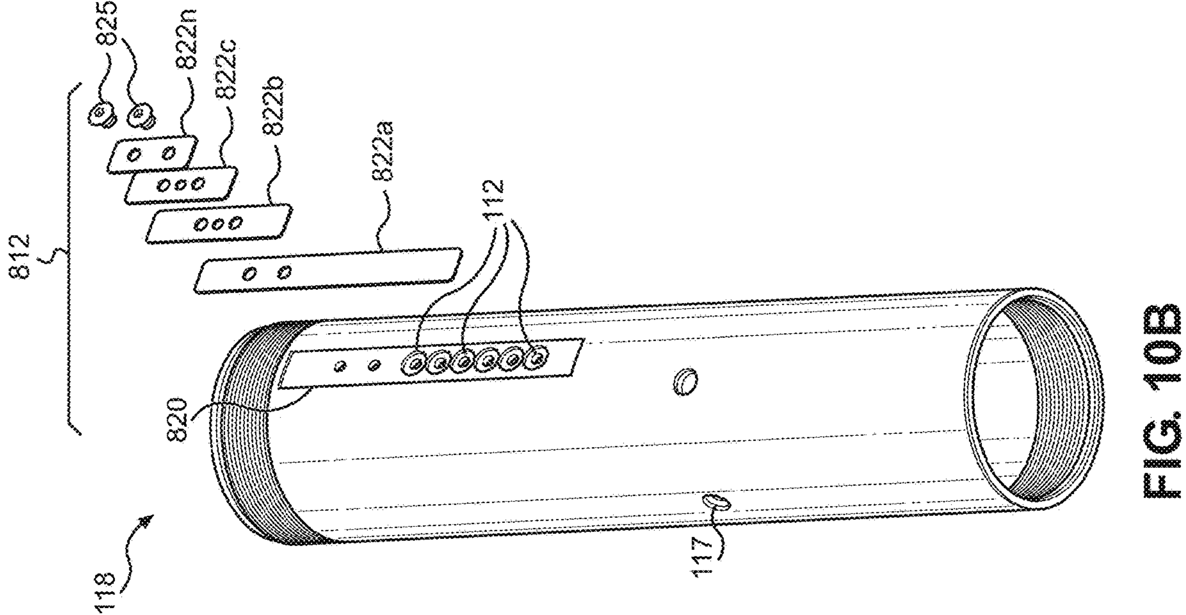
FIG. 10B is an exploded view of the position sensitive element of the optional internal bypass configuration, in accordance with an embodiment.
Figure 10A:
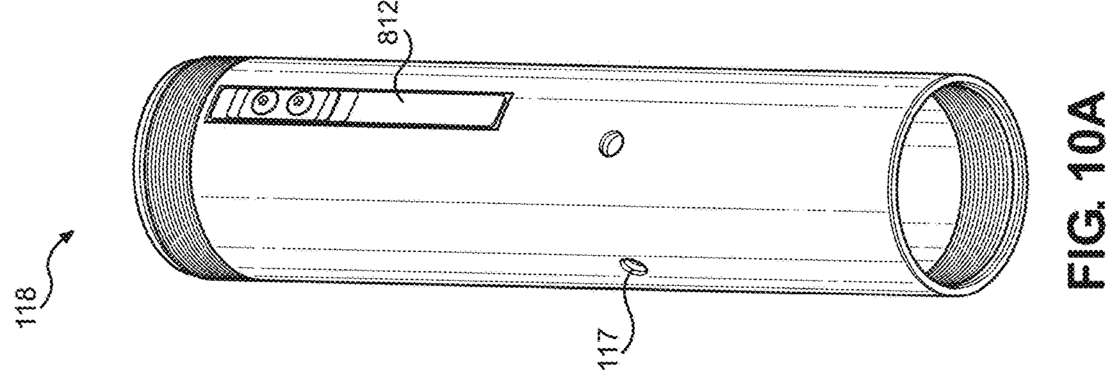
FIG. 10A is a perspective view of an optional internal bypass configuration, in accordance with an embodiment.

Referring now to FIG. 10A, a perspective view of a configuration of annular chamber 118 is shown in accordance with an embodiment. FIG. 10B is an exploded view of the position sensitive element 812 of the annular chamber 118 shown in accordance with an embodiment. Referring now to FIGS. 10A and 10B, annular chamber 118 has a position sensitive element 812 with multiple bypass valves 112 (as shown in FIGS. 2A-5A) and/or one or more slot(s) 820. Position sensitive element 812 also includes one or more shims (e.g., shims 822*a*-822*n*) and one or more retaining devices 825 to retain the shims within the slot 820 and with the appropriate orientation with respect to the multiple bypass valves 112. In one embodiment, the one or more retaining devices 825 may be screws, rivets, bolts, or the like.

In general, during rebound, the shims 822*a*-822*n* of optional position sensitive element 812 close up and prevent any fluid flow through bypass valves 112. In contrast, during compression, the shims 822*a*-822*n* are able to open and fluid can flow out of the compression side 114 down the bypass to the reflow hole(s) 117 and back into the rebound side 116. In one embodiment, the shims of optional position sensitive element 812 are effectively stiffer for the bypass valves 112 closer to the one or more retaining devices 825 as such, optional position sensitive element 812 can be used to change the effective shim stiffness with piston 110 position (another tuning parameter).

In one embodiment, additional relief has been added to one or more of the multiple bypass valves 112. In one embodiment, the additional relief is in the form of counterbores. However, in another embodiment, the additional relief could use other shapes such as, countersinks, slots, and the like when forming the one or more multiple bypass valves 112. In one embodiment, multiple bypass valves 112 are position sensitive. In one embodiment, the effective stiffness of the shims 822*a*-822*n* (e.g., reed valves or the like) increases with stroke, as the remaining of the multiple bypass valves 112 are closer to the pivot point. In one embodiment, the pivot point refers to a point just before the one or more retaining devices 825, where shims 822*a*-822*n* are likely stiff enough to not bend significantly. In one embodiment, the pivot point is at the edge of the retaining devices 825.

In one embodiment, position sensitive element 812 will provide additional position sensitivity per bypass shim. In general, the more checking elements in parallel, the more likely one of them will stick, especially in a colder environment. However, by providing all the holes under one element (e.g., position sensitive element 812), the check shim is less prone to sticking in the cold and therefore, more consistent. In one embodiment, as discussed herein, counterbores may also be added to reduce the proneness for sticking. In one embodiment, providing all the bypass valves 112 under one position sensitive element 812 will also save manufacturing costs.

Figure 11:
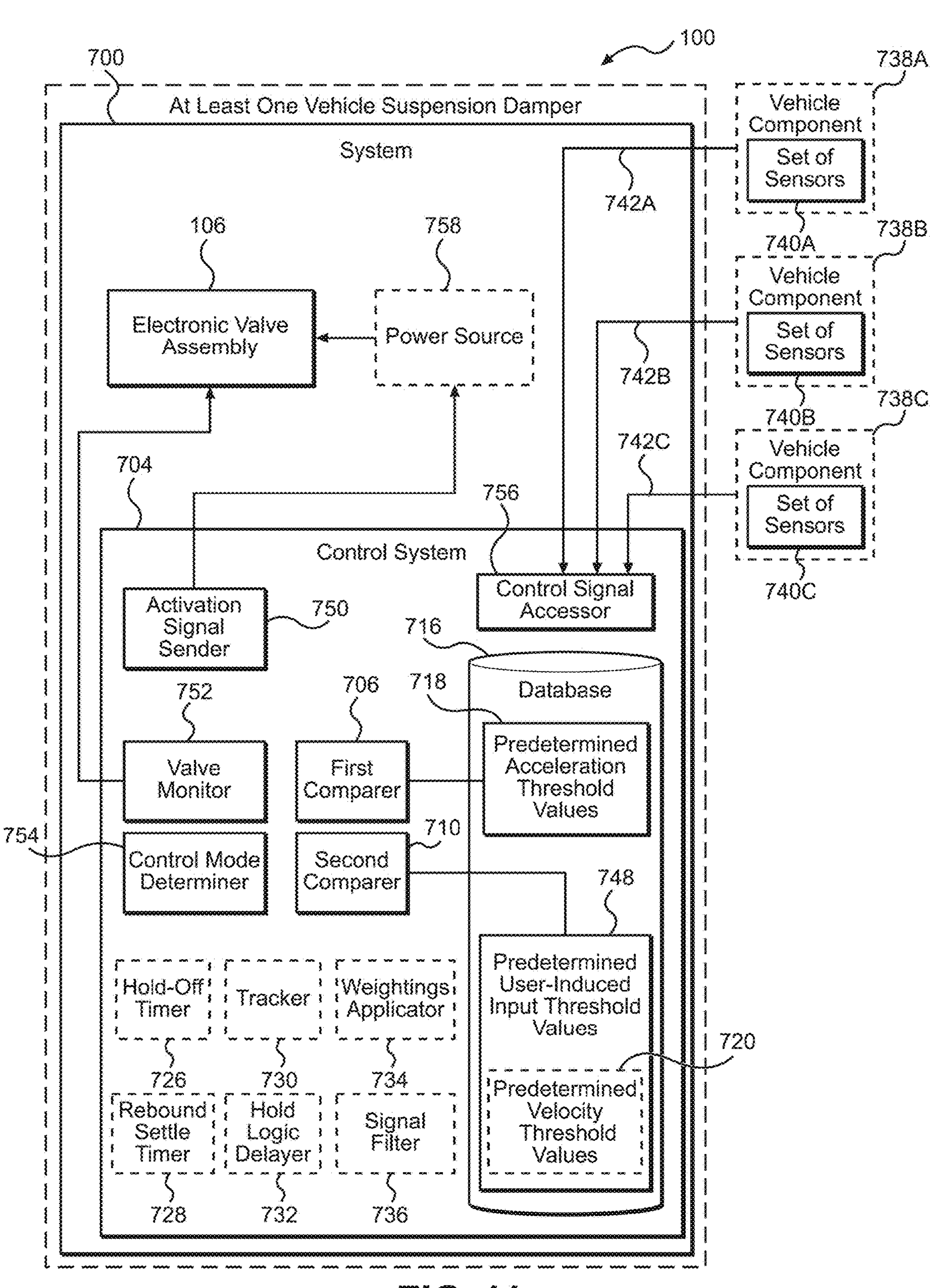
FIG. 11 is a schematic diagram depicting various sensors and a control system used in conjunction with a valve assembly for adjusting a damping force in a shock assembly, in accordance with an embodiment of the present invention.

With reference now to FIG. 11, a schematic diagram depicting various sensors and a control system used in conjunction with valve assembly 106 for adjusting a damping force in shock assembly 100 is provided. The structure and operation of the various components of FIG. 11 are described in further detail in U.S. Pat. No. 9,452,654 which is incorporated herein by reference in its entirety.

FIG. 11 for controlling vehicle motion is described in relation to controlling the operation of a multi-wheeled vehicle, such as, but not limited to, bicycles, motorcycles, e-bikes, trucks, cars, and more specialized vehicles such as, but not limited to side-by-sides and snowmobiles, in accordance with embodiments. It should be appreciated that while the following discussion focuses on vehicles with four wheels, it should be appreciated that embodiments are not limited to controlling the operation upon vehicles with four wheels. For example, embodiments may be used with vehicles with two wheels, three wheels, five wheels, six wheels, etc. Four-wheeled vehicles may have four shock assemblies attached therewith, one shock assembly attached to each wheel and to the vehicle's frame. In one embodiment, the embodiment depicted in FIG. 11 includes a valve assembly 106 as described above.

Various components of FIG. 11 not only deduce the vertical acceleration values, but also deduce, from a received set of control signals (that include acceleration values associated with various vehicle components), the roll and pitch of a vehicle with more than two wheels. These measured acceleration values relate to the tilt (e.g., roll, pitch) of the vehicle and are compared to a database having thereon preprogrammed acceleration threshold values associated with vehicle components as it relates to tilt. Further, various components of FIG. 11 receive measured velocity values associated with user-induced events (e.g., turning a steering wheel, pressing/releasing a brake pedal, pressing/releasing the gas pedal, thereby causing a throttle to open/close). The control system compares these measured velocity values relating to user-induced events to a database having preprogrammed thereon velocity threshold values associated with vehicle components. Based on the comparison performed with regard to the measured acceleration values with the predetermined acceleration threshold values and the measured velocity values with the predetermined velocity threshold values, as well as the determined state of valves within various shock assemblies attached to vehicle components, the control system sends an activation signal to power sources of the shock assemblies. The activation signal activates the power source to deliver a current to one or more of compression valve 106C and rebound valve 106R of valve assembly 106. Once delivered, compression valve 106C and rebound valve 106R of valve assembly 106 adjust to a desired state. The desired state is configured to adjust the damping force to reduce or eliminate the tilt of the vehicle's frame. In other words, the orientation of the vehicle frame is placed as close to level as possible.

As will be described herein, various components of FIG. 11 also provide various system modes within which the shock assemblies may operate, along with control modes for affecting roll and pitch dynamics of the vehicle. Thus, described first herein are systems and methods for controlling a vehicle's motion by increasing and/or decreasing damping forces within a shock assembly in quick response to sensed movement of vehicle components (e.g., vehicle wheel base). These systems and methods may be used in various types of multi-wheeled vehicles, such as, but not limited to, side-by-sides (four-wheel drive off-road vehicle), snow mobiles, etc. These systems and methods may be used to control both the front and the rear shock. The systems and methods described herein quickly and selectively apply damping forces through the shock assemblies (that are coupled with both the vehicle's forks and the vehicle's frame). Such damping enables the vehicle's frame, and thus the vehicle's rider, to experience less acceleration than that being experienced by the wheel base(s).

The system 700 and method, as will be described, detects rolls, pitches, and heaves of four-wheeled vehicles. For example and with regard to detecting rolls, if a car turns a corner sharply left and begins to roll to the right, embodiments sense the velocity of the steering wheel as it is being turned, as well as the translational acceleration associated with the roll experienced by the vehicle. The translational acceleration (distance/time$^2$) associated with the roll measures side accelerations. In response to this sensing and in order to control the roll, a control system causes the outer right front and back shock assemblies to firm up, in some embodiments. Of note, in some embodiments, the vehicle's pitch is measured by sensing the velocity of the throttle pedal as it is being pressed and/or released. In other embodiments, the vehicle's pitch may also be measured by sensing the velocity and/or the position of the throttle pedal as it is being pressed and/or released. In yet other embodiments, the vehicle's pitch is measured by sensing the acceleration of the vehicle. Of further note, the control system does not utilize throttle pedal information to measure roll.

In one embodiment, the system 700 includes valve assembly 106 (that includes compression valve 106C and rebound valve 106R) and the control system 704. In one embodiment, the control system 704 includes the following components: a control signal accessor 756; a first comparer 706; a second comparer 710; a valve monitor 752; a control mode determiner 754; and an activation signal sender 750. The second comparer 710 compares the accessed user-induced inputs to predetermined user-induced inputs threshold values 748 found at, in one embodiment, the database 716 (in another embodiment, a database residing external to the control system 704. Further, in various embodiments, the control system 704 optionally includes any of the following: a database 716, a hold-off timer 726; a tracker 730; a hold logic delayer 732; a rebound settle timer 728; a weightings applicator 734; and a signal filter 736. The database 716, according to various embodiments, optionally includes predetermined acceleration threshold values 718 and predetermined user-induced inputs threshold values 748. In various embodiments, the predetermined user-induced inputs threshold values 748 include predetermined velocity threshold values 720. In other embodiments, the predetermined user-induced inputs threshold values include any of the following values: steering velocity threshold value; shock absorber velocity threshold value; brake velocity threshold value; steering position threshold value; throttle position threshold value; shock absorber position threshold value; and brake threshold value.

In one embodiment, the control system 704 may be part of a shock assembly 100 (that is, for example, on a side-by-side), or it may be wire/wirelessly connected to the control system 704. As will be discussed below, the control system 704 of FIG. 11 is further configured for comparing a set of values associated with at least one user-induced input (such as a user turning a steering wheel and the velocity resulting therefrom) with at least one user-induced input threshold value.

Embodiments of the present invention provide for a control system 704 that accesses a set of control signals 742 (control signal 742A, control signal 742B and control signal 742C; it should be appreciated that there may be any number of control signals, depending on the number of sensors coupled with vehicle components) that includes both acceleration values and a set of values associated with user-induced inputs (such as velocity values [of a steering wheel being turned and/or a throttle pedal being pressed upon and/or released] measured by a set of gyrometers). It should be appreciated that the set of sensors 740A, 740B and 740C (hereinafter, set of sensors 740, unless specifically noted otherwise) attached to the vehicle component 738A, 738B and 738C (hereinafter, vehicle component 738, unless specifically noted otherwise), respectively, may include one or more sensors, such as, but not limited to, accelerometers and gyrometers. In some embodiments, the acceleration values with respect to the four-wheeled vehicles are lateral (side-to-side motion) and longitudinal g's (forward and backwards motion). In other embodiments, the acceleration values with respect to four-wheeled vehicles are lateral g's, longitudinal g's and vertical g's (up and down motion). User-induced inputs, according to embodiments, are those inputs by a user that cause a movement to a vehicle component of the vehicle. For example, user-induced inputs may include, but are not limited to any of the following: turning a steering wheel; pressing a brake pedal (the ON/OFF resultant position of the brake pedal being pressed is measured); and pressing a throttle pedal (a velocity and/or position of the throttle pedal is measured). Thus, a set of values associated with the user-induced inputs may be, but are not limited to being, any of the following user-induced inputs: a measured velocity value of the turning of a steering wheel; a brake's on/off status; velocities associated with pressing down on the brake and/or the throttle pedal; and the difference in the positions of the throttle pedal before and after being pressed (or the absolute throttle position). Of note, the user-induced inputs that are measured are inputs received before acceleration is measured, yet relevant in quickly determining corrective damping forces required to control the roll, pitch and heave once experienced. Thus, the user-induced inputs are precursors to the sensed accelerations of various vehicle components (e.g., vehicle wheels).

Once these values (measured acceleration value and the set of values associated with the user-induced inputs) are accessed by the control signal accessor 756, the first comparer 706 and the second comparer 710 compare these values to threshold values, such as those found in the database 716 (a store of information). Further, according to embodiments, the activation signal sender 750 sends an activation signal to the power source 758 to deliver a current to one or more of compression valve 106C and rebound valve 106R of valve assembly 106, based upon the following: 1) the comparison made between the measured acceleration value and the predetermined acceleration threshold value 718 discussed herein; 2) the comparison made between the measured velocity of the steering wheel as it is being turned (the set of values associated with user-induced inputs) and the predetermined velocity threshold value 720 of the predetermined user-induced inputs threshold values 748; and 3) the monitoring of the state of valve assembly 106.

It should be appreciated that embodiments may include, but are not limited to, other configurations having a control system in wire/wireless communication with the shock assembly to which it is controlling, such as: 1) a vehicle with only one control system that is wire and/or wirelessly connected to all shock assemblies attached thereto; 2) a vehicle with one control system attached to one shock assembly, wherein the one control system controls the other control systems attached to other shock assemblies (that are attached to different wheels) of the vehicle; and 3) a vehicle with one control system that is not attached to a shock assembly, wherein the one control system controls other control systems that are attached to shock assemblies on the vehicle.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What is claimed is:

1. A valve assembly for a shock assembly, said valve assembly comprising:

a first valve disposed along a compression bypass flow path extending between a compression side of a damping housing and a rebound side of said damping housing, said first valve configured to control flow of fluid from at least one bypass valve of said compression side of said damping housing into said rebound side of said damping housing;

a second valve disposed along a rebound flow path extending between said rebound side of said damping housing and said compression side of said damping housing, said second valve configured to control flow of fluid from said rebound side of said damping housing into said compression side of said damping housing; and a compression side check valve separating said compression side from a reservoir chamber, such that said rebound flow path through said second valve extends through said reservoir chamber and through said compression side check valve to said compression side.

2. The valve assembly of claim 1, wherein said first valve is able to control said flow of said fluid along a ride zone of said shock assembly.

3. The valve assembly of claim 1, further comprising:

a rebound side check valve separating said rebound side from a reservoir chamber, such that said compression bypass flow path through said first valve extends through said reservoir chamber and through said rebound side check valve to said rebound side.

4. The valve assembly of claim 1, wherein at least one of said first valve and said second valve is adjustable.

5. The valve assembly of claim 1, wherein at least one of said first valve and said second valve is non-static.

6. The valve assembly of claim 1, further comprising:

a plurality of bypass valves, wherein said plurality of bypass valves are position sensitive holes arranged axially along said compression side of said damping housing.

7. A shock assembly comprising:

a damping housing;

a piston movable within said damping housing;

a compression side of said damping housing at least partially defined by said piston, said compression side comprising a at least one bypass valve;

a rebound side of said damping housing at least partially defined by said piston;

a fluid reservoir fluidically coupled to said damping housing;

a valve assembly comprising:

a first valve disposed along a compression bypass flow path extending between a compression side of a damping housing and a rebound side of said damping housing, said first valve configured to control flow of fluid from at least one bypass valve of said compression side of said damping housing into said rebound side of said damping housing;

a second valve disposed along a rebound flow path extending between said rebound side of said damping housing and said compression side of said damping housing, said second valve configured to control flow of fluid from said rebound side of said damping housing into said compression side of said damping housing; and a compression side check valve separating said compression side from said fluid reservoir, such that said rebound flow path through said second valve extends through said reservoir chamber and through said compression side check valve to said compression side.

8. The shock assembly of claim 7, wherein said first valve is able to control said flow of said fluid along a ride zone of said shock assembly.

9. The shock assembly of claim 7, further comprising:

a rebound side check valve separating said rebound side from said fluid reservoir, such that said compression bypass flow path through said first valve extends through said reservoir chamber and through said rebound side check valve to said rebound side.

10. The shock assembly of claim 7, wherein at least one of said first valve and said second valve is adjustable.

11. The shock assembly of claim 7, wherein at least one of said first valve and said second valve is non-static.

12. The shock assembly of claim 7, further comprising:

a plurality of bypass valves, wherein said plurality of bypass valves are position sensitive holes arranged axially along said compression side of said damping housing.

* * * * *